United States Patent [19]

Ogawa

[11] 3,809,204

[45] May 7, 1974

[54] KEYBOARD SYSTEM FOR CHINESE CHARACTER TELEPRINTER, CHINESE CHARACTER TYPEWRITER, MONOTYPE ETC.

[75] Inventor: Shimeo Ogawa, Kitakami, Japan

[73] Assignee: Yamura Kabushiki Kaisha Shinkoseisakusho, Hanamaki-shi, Iwate-ken, Japan

[22] Filed: Dec. 27, 1971

[21] Appl. No.: 212,330

[52] U.S. Cl. .......... 197/1 A

[51] Int. Cl. .......... B41j 3/50

[58] Field of Search .......... 197/1 A, 1, 98; 235/145

[56] References Cited

UNITED STATES PATENTS

| | | | |
|---|---|---|---|
| 1,247,585 | 11/1917 | Shah | 197/1 A |
| 2,412,777 | 12/1946 | Kao | 197/1 A |
| 2,613,795 | 10/1952 | Yutang | 197/1 A |
| 2,728,816 | 12/1955 | Kao | 197/1 A X |

*Primary Examiner*—Robert E. Pulfrey
*Assistant Examiner*—R. T. Rader
*Attorney, Agent, or Firm*—Wenderoth, Lind & Ponack

[57] ABSTRACT

A teleprinter apparatus for producing pairs of seven element code units which together represent a character or symbol, such as a Chinese character. The apparatus has a keyboard much like the keyboard of a conventional teleprinter or typewriter for typing Roman letters, numbers and symbols, and the keyboard is connected to conventional apparatus for producing seven element code units each time a key is depressed. As a guide to the pairs of keys which are to be depressed to produce desired pairs of code units for representing the desired character, there is provided a character board which has two sets of blocks thereon. Each set has the same number of blocks as there are keys, and each block in each set corresponds to an individual key character. The blocks are in the same arrangement as the arrangement of the keys. Each of the blocks in one set has therein a plurality of characters for which code units are produced, and the characters are arranged in the same pattern as the pattern of the keys on one half of the keyboard. Each of the blocks in the other set has the characters arranged therein in the same pattern as the keys on the other half of the keyboard. A character for which the code units are to be produced is located in one of the blocks on the character board, and the key corresponding to the block is actuated to produce the first code unit and then the key corresponding to the position of the character in the block is actuated to produce the second code unit.

5 Claims, 40 Drawing Figures

KEYBOARD SYSTEM FOR CHINESE CHARACTER TELEPRINTER, CHINESE CHARACTER TYPEWRITER, MONOTYPE ETC.

BACKGROUND OF THE INVENTION

This invention relates to a keyboard system used for Chinese a character teleprinter, a Chinese character electric type writer, a full automatic monotype, etc., which are required to distinguish among more than two thousand characters, yet which system most effectively aids human operation and yet is a cheap and widely usable keyboard system. The Chinese character teleprinter or the full automatic monotype heretofore used provides for about two thousand five hundred characters, the most widely used keyboards have a key for each two, four or 12 to 16 characters. For keyboards having two character keys, more than one thousand two hundred keys are required, and for keyboards having four character keys, more than six hundred keys are required, which result in extremely large keyboard surfaces and low operating speeds because of the wide range over which it is required to move hands. About two hundred keys are required for keyboards in which each key is for 12 to 16 characters, which results in a keyboard surface about four times as large as a conventional typewriter, and this type of keyboard is presently said to have the highest operating efficiency. However, the common disadvantage of these keyboard systems is the large keyboard surface, which makes it impossible to operate it without observing character keys, contrary to the touch system which can be used on a typewriter for Roman letters. Therefore, it is required to indicate on the character key all characters which the key will produce, and to operate the key after searching for the corresponding character with the eyes, which results in an extremely low operating efficiency. The combination of the steps of searching the keyboard for the position of the key with eyes and then operating the keys by hand, delays the step of searching for the next character until the operation for producing one character is finished.

If the key is for producing about 12 characters, as many distinguishing keys as the number of the characters produced by each key are required in order to select one character from among 12, and one hand is used to operate the distinguishing keys by touch, and therefore the other hand must be used to operate individual keys among two hundred keys, which results in reduction of the operating efficiency because of the wide range of movement required of the operating hand.

The object of the present invention is to miniaturize the keyboard and to enable touch operation of the keys, which leads to high operating efficiency and makes it possible to manufacture a cheaper keyboard.

OBJECTS AND BRIEF DESCRIPTION OF THE INVENTION

Generally, a Chinese character teleprinter contains more than two thousand five hundred characters, which requires a code having more than 12 unit to transmits them through a common teleprinter line. Therefore, one character can be indicated by two six-element code units which are transmitted independently, and punched codes on paper tape widely used in teleprinters, full automatic monotypes and electronic computers are transmitted as two continuous independent codes. (The first code unit of the two six-element code units which indicate one character will hereinafter be called the X-code unit, and the second six-element code unit will be called the Y-code unit). Thus, in a Chinese character teleprinter or the full automatic monotype, two characters or signals, i.e., an X-code unit and a Y-code unit are transmitted for one character, or the movement of the parts of the device is controlled by an X-code unit and a Y-code unit punched on paper tape. The maximum number of different X-code units or Y-code units which can be formed from a six-element code unit is 64, which theoretically makes it possible to represent more than three thousand characters without taking into account special erasure or DEL codes, blank or BL codes, signal or BEL codes, activation or SOH codes and termination or ETX codes. Therefore, if two particular X-code and Y-code keys which together indicate a character are operated independently, it is possible to use a typewriter for Roman letters and to operate the keyboard by touch, which makes possible a simpler construction and higher operating speed. In order to make it possible to operate the keys by touch, the character indicating board should be separated from the keyboard, which enables skilled operators to look for next characters at the same time as they operate a key, which makes possible the higher operating speed. The primary object of the present invention is, as stated above, to devise a keyboard and a character board separated from the keyboard for a Chinese character teleprinter, etc., similar to that of typewriters for Roman letters, in order to enable touch operation which gives the highest efficiency of operation and the highest performance of the device. Several requirements must be met to achieve this object.

First, easy reference to characters. Second, the correspondence of the character board and the keyboard arrangement, which facilitates the operation of the keys by means of the position of the characters on the character board. Third, separation of operation of the X-code and the Y-code for the frequently used characters to the right and the left hands, which lead to more even or balanced use of both hands. Fourth, in receivers and full automatic monotypes, equipment to arrange characters according to their frequency of use, which makes possible the effective operation of the device.

The primary characteristic of the present invention is to facilitate the consideration of keys to be operated by means of character position on the character board, by arranging code keys on the keyboard similar to those of teleprinters or typewriters for Roman type according to the order of characters on the character board considering the frequency of use of the characters, and separating the character arrangement so to that the first code unit (X-code) and the second code unit (Y-code) are produced by operating corresponding character on the character board by the right hand and the left hand respectively. The secondary characteristic of this invention is to provide means for producing frequently used characters, for example, right hand operation of the X-code or left hand operation of the Y-code, when this invention is applied to widely used code and character arrangements, which makes the introduction of this invention effective in the Chinese character telegram system which uses a conventional code and character arrangement.

BRIEF DESCRIPTION OF THE DRAWINGS

FIG. 24 illustrates a sectional example of concrete character arrangement in FIG. 23 corresponding to FIG. 20.

DETAILED DESCRIPTION OF THE INVENTION

With reference to the drawings, the invention will now be described in more detail.

Figure 1:
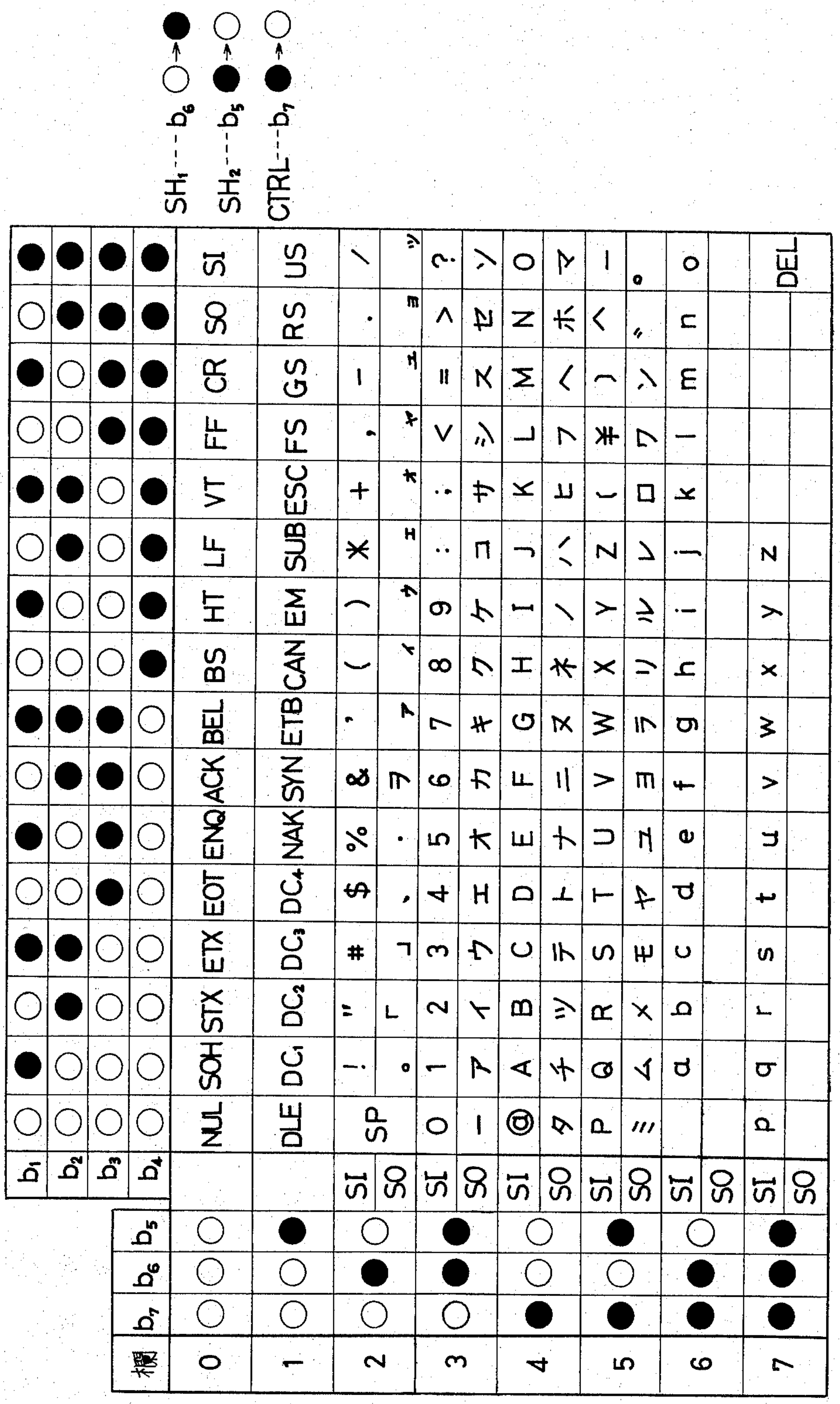
FIG. 1 is a representation of the seven-element code units for international information interchange used for the purpose of explaining an example of this invention.
Figure 2:
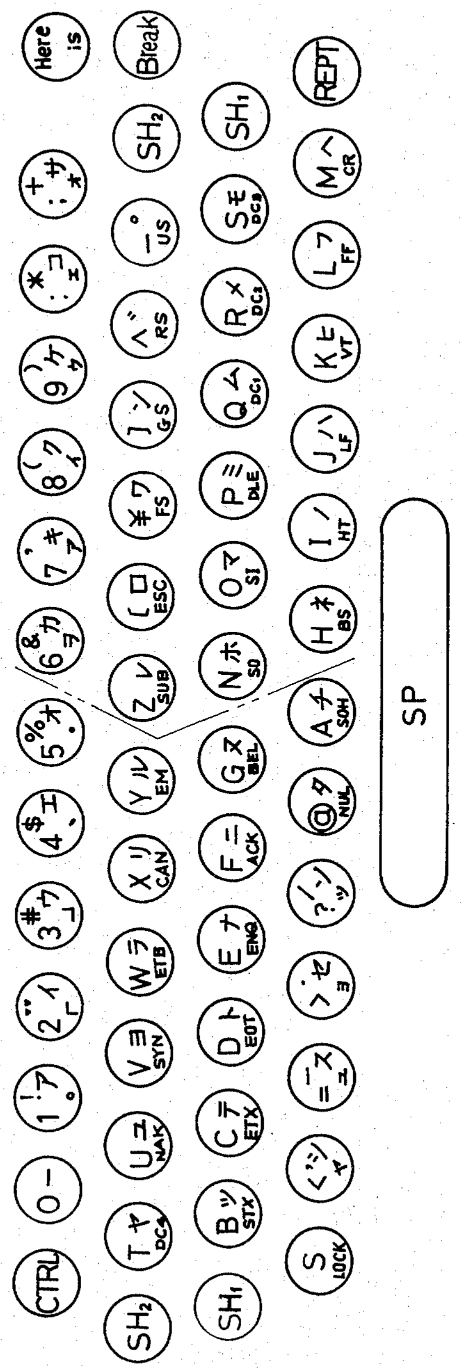
FIG. 2 is a representation of a keyboard code key arrangement of this invention using code units in FIG. 1.

In FIG. 1 is shown a table of the seven-element code units (hereinafter called the ISO code) for international information interchange which has recently been internationally discussed and which will be published by ISO and CCITT. Although conventional Chinese character teleprinters are based on the six element code units because the six element code unit is the conventional teleprinter code in Japan, the present invention is applicable to both a six element code unit and a seven element code unit. Considering the future application of the Chinese character teleprinter, an application of this invention using the ISO code will be explained in a first example. FIG. 2 illustrates an example of an arrangement of character keys of a keyboard which produces ISO code units according to FIG. 1. ISO code units are seven element code units as shown in FIG. 1, consisting of seven code elements *b*1, *b*2, *b*3, *b*4, *b*5, *b*6 and *b*7 which in their various permutations and combinations can make 128 different code units in all. The code units can be represented in such conventional ways as punches in columns in a tape, magnetic dots in columns on a tape, etc. As shown in FIG. 1, 32 code unit in the zero row and the first row in which elements *b*6 and *b*7 are spaces (e.g., are not punched or magnetic dots are absent) are assigned to control code units such as a transmission control code unit, form control code unit attached equipment control code unit, etc. The 64 code units in the second, the third, the fourth and fifth rows in which b6 and b7 are a space and a mark, and a mark and a, respectively constitute character code units such as numbers, Roman capitals and other widely used symbols. The sixth and the seventh rows in which b6 and b7 are a mark and a mark, respectively, chiefly contain Roman small characters and a few code units are for characters and symbols used in various countries. Function code units S0 and S1, in the last two spaces of the zero row in FIG. 1 identify one of two characters assigned to each of the 96 code units in the second to the seventh rows in FIG. 1, according to whether function code units S0 or S1 is present in the series of code units. When the code unit S1 is used, i.e. when the keyboard is in the S1 condition, the 94 code units, omitting SP and DEL, in the second to the seventh rows indicate figures, symbols Roman capital and small letters, as shown in the S1 rows. Similarly, when code unit S0 is used, i.e. the keyboard is in the S0 condition, the code units represent, in Japan, a square form of Japanese syllablry, as shown in the S0 rows of the second to the fifth rows. Characters assigned to the S0 rows in the sixth and the seventh rows have not yet been decided in Japan. Thus, in the ISO code, excluding the 32 function code units, 94 character codes can be used and the binary sequence of code to character arrangement makes it possible to eliminate the confusion which arose from the six element code units in which in the Japanese and European teleprinter and the Chinese character teleprinter, several character code in the former have been used for function control code in the latter and several character code units in the latter have been used for function code units in the former. Namely, function code units in the zero and the first rows and the DEL code units (erasure code) in the extreme right in the seventh row of the ISO code can be used in the Chinese character teleprinter as function code units which perform the same functions as in Roman letter teleprinters, and if a character is indicated by two of 94 code units (other than SP and DEL), it is possible to make a Chinese character teleprinter for 94 × 94 = 8836 characters. The indication the a character by two ISO character code units has the great advantage that of the Chinese character teleprinter and the English or the Japanese and European the for the ISO code use the same code, and only the internal construction of the receiver will differ in that in the former a character is printed in response to two character code unit, while in the latter a character code unit is translated into a single character, which makes possible the common use of keyboards, code transmission mechanisms, code receiving mechanisms, code punching mechanisms, various systems for code transmission and various information processing systems including electronic computers. The reason why the first example of this specification has been explained according to the ISO code, is the promising future of THE Chinese character teleprinter described above.

In an example of the keyboard arrangement in FIG. 2 based on the ISO code, 48 character keys are arranged according to each of 48 characters in the third, the fourth and the fifth rows in FIG. 1, the characters assigned to code units for the S1 condition being on the left side of each key and those for the SO condition on the right side. The respective keys on the keyboard are coupled with conventional teleprinter means for producing seven element code units corresponding to the keys. The SH2 key functions to convert code element *b5* in FIG. 1 from the mark condition to the space condition, which makes it possible to produce code units for the characters in the second row in FIG. 1 by operating character keys corresponding to characters in the third row in FIG. 1 while the SH2 key is pushed down. Similarly, the SH1 key functions to convert *b6* in FIG. 1 from a space to a mark, which is used with keys corresponding to characters in the fourth and the fifth rows in FIG. 1 to produce code units for the character corresponding to those in the sixth and the seventh rows of FIG. 1. Actuation of the SH1 key only will produce the code units for the characters in row six and seven, while actuation of both SH1 and SH2 keys will produce code units for the characters in the second row. The S. LOCK key maintains the SH1 key in the actuated condition, which is useful for continuous production of code units for lower case Roman Characters in the sixth and seventh rows. Restoration of the SH1 key to the deactivated condition is usually obtained by pushing the SH1 key down as in a conventional typewriter. The CTRL key is provided to convert the mark condition of *b7* to the space condition, which produces code units corresponding to the zero and the first rows in FIG. 1, so that code units for the characters in the zero and first rows can be produced by pushing down keys corresponding to characters in the fourth and fifth rows while the CTRL key is pushed down. On the keys for the characters in the third row, the characters in the second row of FIG. 1 produced while the SH2 key is pushed down, are indicated as follows: the character for the S1 condition is indicated in the upper part of the corresponding character key and that for the SO condition in the lower part. Function codes of the zero and first rows of FIG. 1, produced when the CTRL key is pushed down, are also indicated in the lower parts of corresponding keys for the fourth and fifth rows. The SP key in FIG. 2 is the space code key according to the conventional Roman letter typewriter. Keys such as Break and Rept are illustrated according to the conventional general teleprinters, and therefore they are neither code keys nor have they any direct relation to the present invention.

Figure 3:
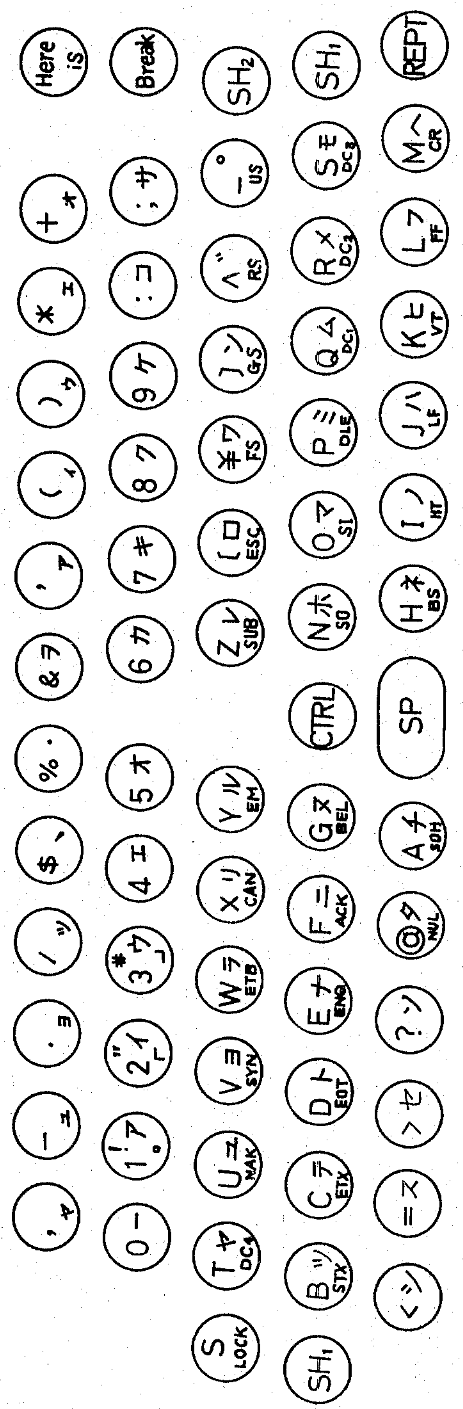
FIG. 3 is a representation of a modification of the keyboard of FIG. 2.

The reasons why the number of character keys in the keyboard in FIG. 2 is 48, are mainly to make the system similar to the Roman letter typewriter in operation and scale. Such a typewriter has keys arranged in four ranks and six files for each hand and if the code units are used two at a time to designate a Chinese character, the typewriter can generate a total number of 48 × 48 = 2304 usable character code units for Chinese characters even without the addition of the code units made possible by the SH2 and the SH1 keys, and this number of characters being regarded to be most reasonable considering the number of Chinese characters in everyday use and the requirements for other characters. Five ranks totaling 60 keys can be used and the key arrangement illustrated in FIG. 3 is within the scope of the present invention. Although the designation and the function of each key in FIG. 3 is the same as in FIG. 2, only code units are produced from the combination of the SH2 key and three other keys for the symbols !, ", and #, because ten independent keys are added to the keyboard.

Figure 4A:
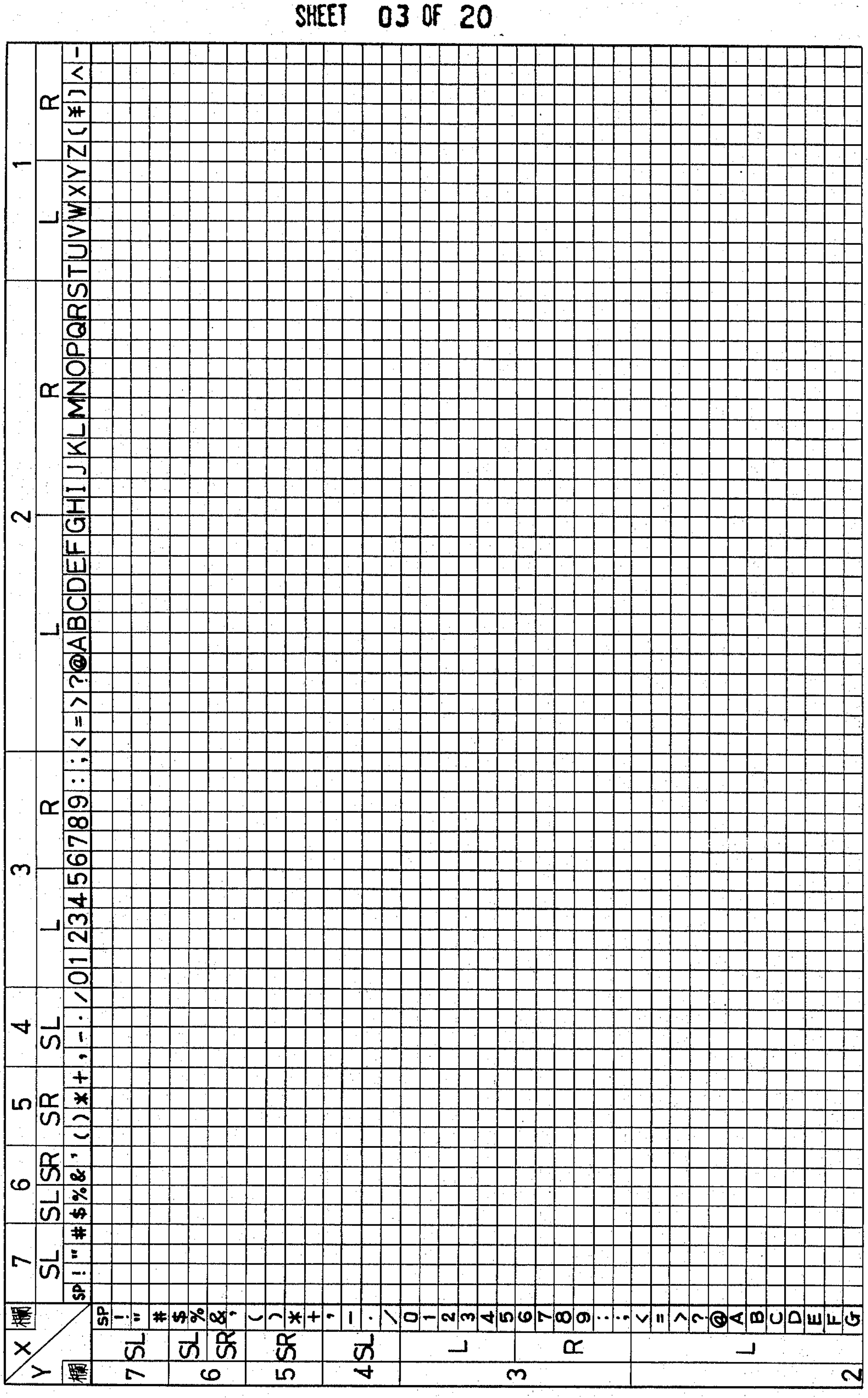
FIGS. 4*a* and 4*b* are parts of a chart representing the correspondence principle of code units to character arrangement using the code of FIG. 1.
Figure 4B:
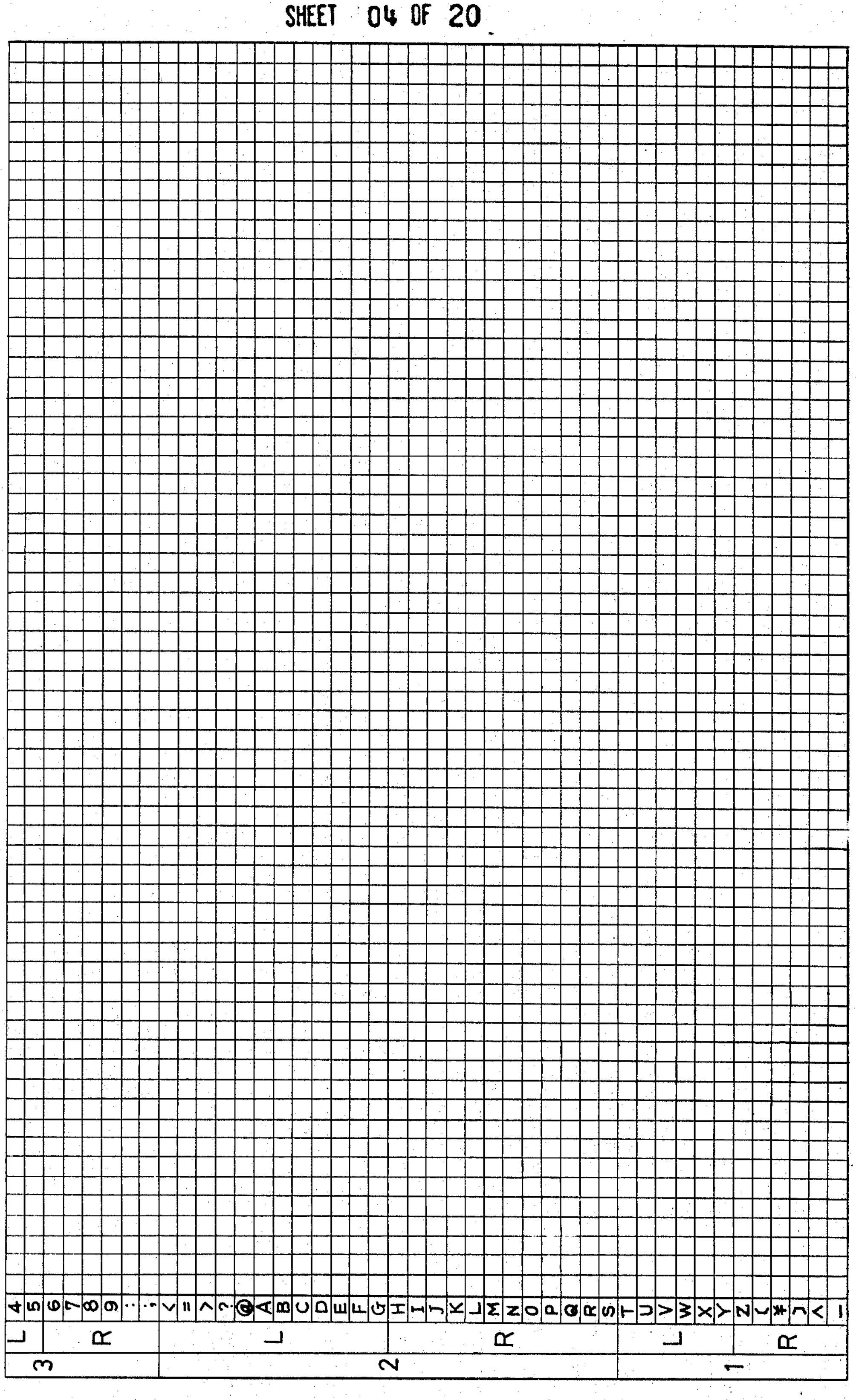

FIGS. 4A and 4B together illustrate an example of a table for assigning ISO code characters for producing two ISO code units designating one Chinese character. A grid with 64 × 64 = 4096 positions is produced by arranging 64 characters corresponding to the ISO code for producing X-code units horizontally and 64 ISO characters for producing Y-code units vertically, respectively, one position on the grid being assigned to one Chinese character, and the Chinese characters being arranged on the grid according to their frequency of use, pronunciation or shape. The table is usually divided into suitable blocks according to convenience and ease in looking up the Chinese characters and the frequency of use, in order to operate the teleprinter or the full automatic monotype most effectively. Since the arrangement of codes in FIG. 4 follows the binary sequence of the ISO code, it is directly applicable to the type arrangement in the type case etc. In this case, frequently used characters are generally gathered at the center, especially the Japanese cursive and the square syllablries are contained gathering to the close block.

Figure 5:
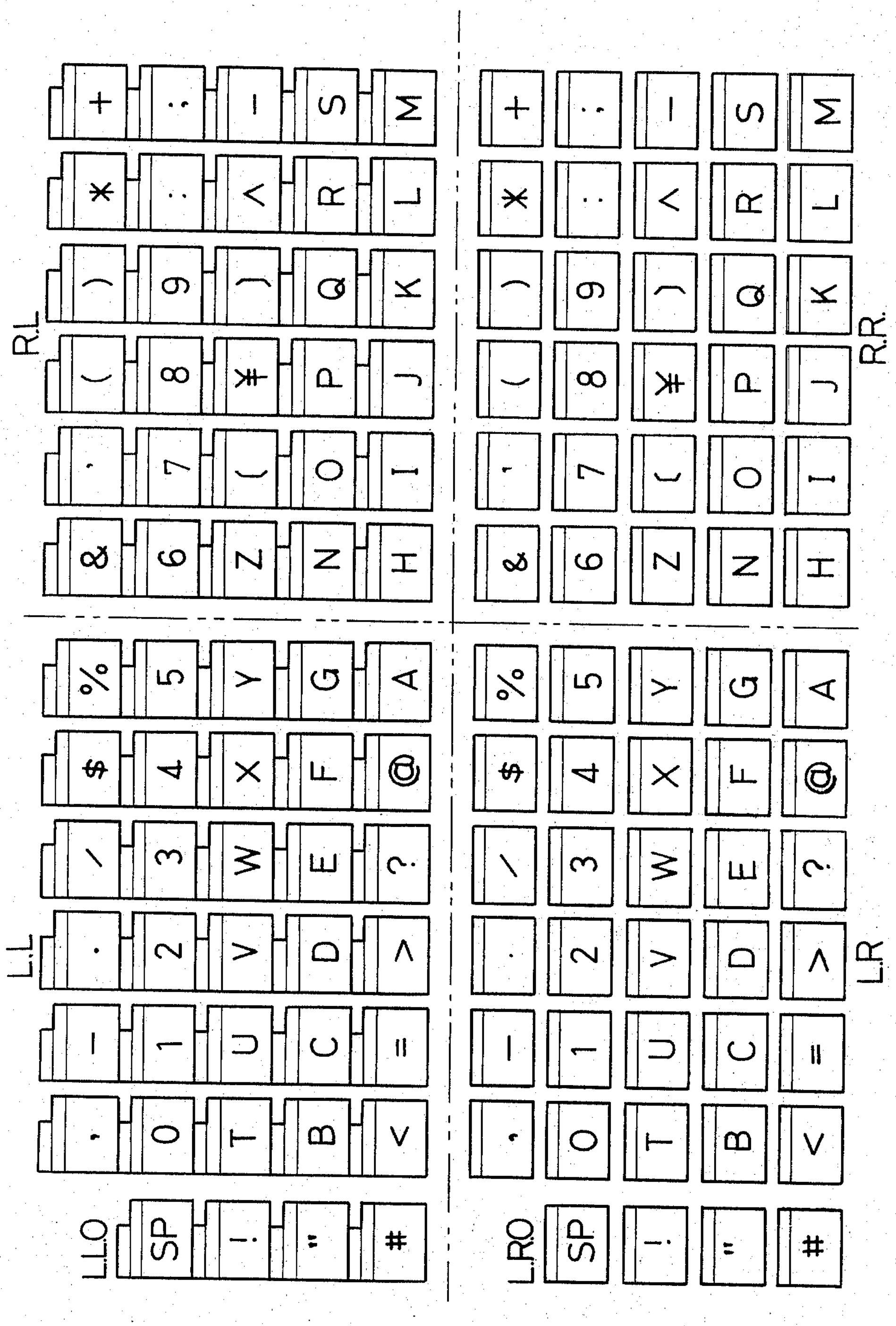
FIG. 5, FIG. 6 and FIG. 7 illustrate examples of the type of character board and the arrangement of characters which correspond to the code in FIG. 1 and the keyboard arrangement in FIG. 2 and FIG. 3.
Figures 6, 7, 8, 9, 10, 11:
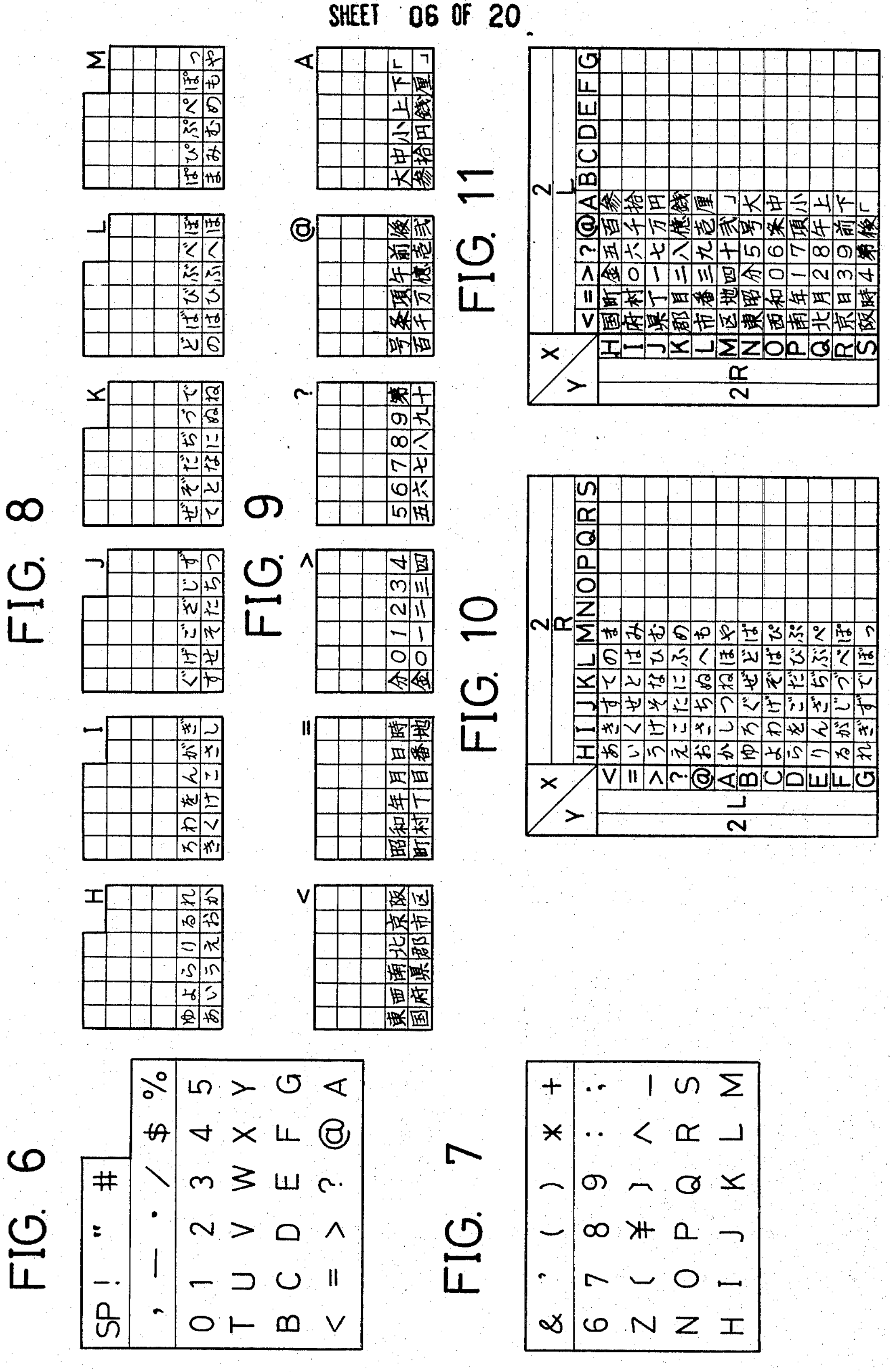
FIG. 8 and FIG. 9 illustrate one concrete example of an arrangement of characters corresponding to a part of FIG. 5.
FIG. 10 and FIG. 11 are views illustrating how the characters in the chart of FIG. 8 and FIG. 9 are arranged in FIG. 4.

FIGS. 5–7 are for explaining an example of the character board used for finding and actuating keys on the keyboard in FIG. 2 or FIG. 3. In FIG. 5, upper and lower groups of blocks corresponding to the characters on keys in FIG. 2 or FIG. 3 are provided with the blocks arranged in positions corresponding to the positions of the keyboard keys (each block in the Figure having shown thereon the corresponding character of the ISO code in the S1 condition for ease in correlating FIG. 5 with FIG. 2). Pushing of a key on the keyboard corresponding to this character will produce from the apparatus an X-code unit corresponding to an X-code character according to the table in FIG. 4, i.e. the first of two codes corresponding to a Chinese character. The character key to actuate for producing a Y-code unit for the Chinese character is given by arrangements of Chinese characters within blocks in FIG. 5, the positions of the Chinese characters in each block being according to the positions of ISO characters illustrated in FIGS. 6 and 7. FIG. 6 shows an arrangement of ISO characters for each block of the upper half of FIG. 5, and FIG. 7 shows an arrangement of ISO characters for each block of the lower half of FIG. 5. It will thus be seen that there has been provided in each block corresponding to a character on the keyboard positions corresponding to all the characters of the keyboard.

Therefore when Chinese characters are arranged in each block in FIG. 5 according to the arrangement illustrated in FIG. 6 and FIG. 7, the keys of the keyboard are operated depending on where on the character board the Chinese character is located. For example, for the generation of two code units for the Chinese character indicated by ISO characters AZ, according to the table of FIG. 4, the Chinese character is located at the position indicated by Z in FIG. 7 in the block indicated by A in the lower half of FIG. 5, and to produce the code units for this Chinese character, the operator operates the "A" key of the keyboard with the left hand for causing the apparatus to produce the X code unit, and then operates the "Z" key with the right hand. As illustrated in FIG. 5, the character board is divided into four quadrants, L.L., R.L., L.R. and R.R. When the Chinese character is in a block in the L.L. quadrant, both the X and the Y code units are produced by operating keys on the left hand side of the keyboard. When the Chinese characters are in a block in the R.L. quadrant, the X and the Y code units are produced by operating keys on the right and then the left sides of the keyboard, respectively. When the Chinese character is in a block in the L.R. quadrant, the X and the Y code units are produced by operating keys on the left and then the right sides of the keyboard respectively, and when the Chinese character is in a block in the R.R. quadrant, both the X and the Y code units are produced by operating keys on the right hand side of the keyboard. The size of each of the blocks is large enough so that operators can distinguish the Chinese characters within the block readily, and can remember the X code and the Y code keys to be operated from the position of the character. A space or an additional line in the center of the six rows will facilitate easy location of the characters.

FIG. 4 and FIG. 5 illustrate the case in which 64 × 64 = 4096 characters are provided for by use of all 64 key characters, including the SP character. On the other hand, if the number of keys on the keyboard in FIG. 2 is restricted to 48 and the SH1 key and the SH2 key are not provided, 48 × 48 = 2304 characters can be provided for, and in FIG. 4 only the 48 key characters of groups 1, 2 and 3 in the X and Y key character columns have Chinese characters assigned thereto, while on the character board of code blocks indicated by "SP","!", ",," and " # " in the extreme left column and code blocks indicated by ",", "–", ", ".", "/", "$" and "%" in the extreme upper row in the L.L and L.R blocks, and similarly code blocks indicated by "&", ",", "(", ")", "*" and "+" in the extreme upper row in the R.L and the R.R blocks are omitted. Also in each code block, the columns and rows of Chinese characters in positions corresponding to the same characters in FIG. 6 and FIG. 7 are omitted, and the arrangement is reduced to four rows and six files of Chinese characters. Therefor, the character board in FIG. 5 is simplified and becomes more convenient for practical use. If more than 2304 characters are needed, it is convenient to add key characters of groups 4, 5, 6 and 7 respectively for the X and the Y key character columns in FIG. 4. Thus the number of characters which can be provided for is increased as follows: when the key characters in groups 1, 2, 3 and 4 are used, there can be 52 × 52 = 2704 Chinese characters provided for; where key characters in groups 1, 2, 3, 4, and 5 are used, there can be 56 × 56 = 3136 Chinese characters provided for; where the key characters in groups 1, 2, 3, 4, 5, and 6 are used, there can be 60 × 60 = 3600 Chinese characters provided for; and where all the key character groups are used, 64 × 64 = 4096 Chinese characters can be provided for. Generally, it is desirable to assign the more frequently used 576 characters from among the 2304 commonly used characters to a group of frequently used characters for efficient operation of the teleprinter and the fully automatic monotype, assigning to them the 24 key characters of group 2 of key characters in the X and Y columns in the table of FIG. 4. The most frequently used characters such as Japanese cursive characters, figures and several Chinese characters in the frequently used characters are placed at positions in FIG. 4 such that the X key character therefor is in the L position in group 2 and the Y key character therefor is in the R position in group 2, or vice versa, which results in higher operating efficiency by making possible action of the right and left hands of the operator to produce code units for the corresponding most frequently used characters. If Japanese cursive and square characters, letters A, B, C, etc., are assigned as key characters to these Chinese characters and are used continuously, it is desirable and effective with respect to the machine construction to arrange them in blocks where alternative operation by both hands is possible, e.g. with the X key character in the 2L group and the Y key character in the 2R group.

By arranging the frequently used characters according to the Principle stated above, these Chinese characters or Japanese cursive characters are in positions on the character board in FIG. 5, arranged according to the pattern of FIG. 6 and FIG. 7, contained in blocks in the lower two rows of the sections of blocks in FIG. 5, and as is evident from FIG. 6 and FIG. 7, they are collected in the lower two rows within each code block. Therefore, code units for the frequently used characters are produced by operating keys in the lower two rows of the keyboard in FIG. 2, which makes the key operation extremely efficient. The most frequently used characters, ones for which code units are produced by alternative operation of both hands, have the key characters therefor in the R.L and L.R blocks in FIG. 5, which effectively aids both looking up characters on the character board and key operation.

FIGS. 8–11 illustrate partially a concrete example of the Chinese character arrangement on the character board based on the principle described in connection with FIGS. 5–7. In FIG. 8, Japanese cursive characters are arranged in the lower two rows within code blocks corresponding to H, I, J, K, L and M in the lowest row in the R.L block at the upper right in FIG. 5, and in FIG. 9 relatively frequent characters such as Chinese characters and figures are arranged in the lower two rows within the code blocks corresponding to ,=, ,?, @and A in the lowest row in the L.R. block corresponding to the lower left in FIG. 5. FIG. 10 illustrates a portion of a table similar to FIG. 4 for the characters arranged in the blocks of FIG. 8, wherein only the 2R group in the X column and the 2L group in the Y column are illustrated. Similarly, FIG. 11 illustrates a portion of a table similar to FIG. 4 for the characters in the blocks in FIG. 9. It will be seen that, for the Japanese cursive characterん" in FIG. 8, for example, the key characters assigned thereto from the Y column is F from the 2L group, and that from the X column is L from the 2R group. This Japanese cursive character therefore appears at the position corresponding to F from FIG. 6 in the block L of FIG. 8, indicating to the operator that the code units representing this Japanese cursive character can be produced from the apparatus by first depressing the key for key character L on the keyboard of FIG. 2 with the right hand, and then depressing the key for key character F on the keyboard of FIG. 2 with the left hand.

Figure 12:
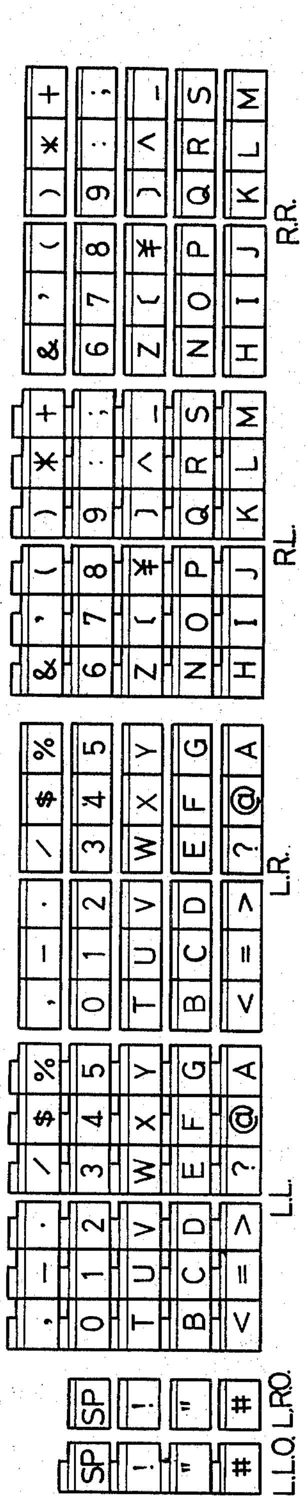
FIG. 12 illustrates an example of a modification of FIG. 5.
Figure 13:
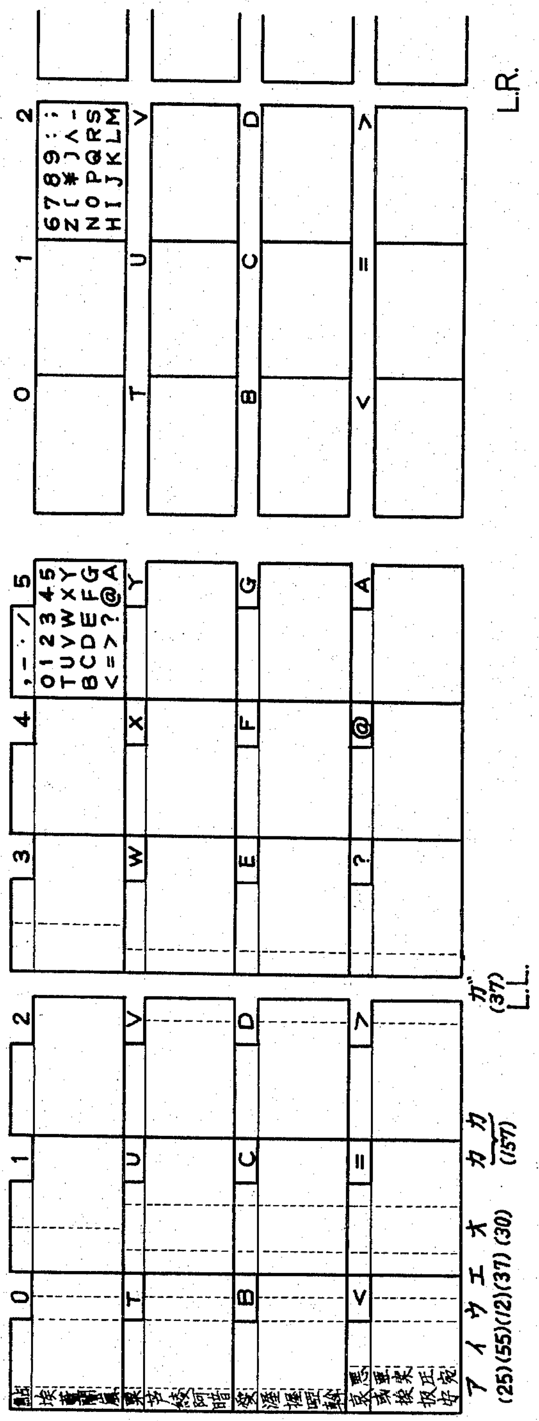
FIG. 13 illustrates a concrete example of a method of arranging arrange the character keys in FIG. 12 according to the Chinese pronunciation and the Japanese pronunciation of Chinese characters and their frequency in use.

FIG. 12 illustrates an example of a most useful character board, wherein the arrangement of the groups of blocks L.L, L.R, R.L and R.R in FIG. 5 is modified. In FIG. 12, long width and are laid out in an area having a short length, a and the L.R and R.L blocks indicating the alternative operation by both hands are arranged in the center, and the key characters corresponding to groups X-2 and Y-2 in FIG. 4 are collected in the lower two rows as illustrated in FIG. 6 and FIG. 7, and in blocks in the lower two rows of groups L.L, L.R, R.L and R.R. Therefore, the most frequently used 288 characters are arranged as shown the FIG. 8 and FIG. 9 in lower two rows in each block of the blocks in the lower two rows in groups L.R. and R.L., and other characters classified, for example in the order of the Japanese Alphabet, their pronunciation or their form, are arranged in an appropriate arrangement in the remainder of the blocks. For example, characters belonging to the "ア" group of the Japanese alphabet from among the total number of characters are at the extreme left of the blocks of group L.L., as illustrated in FIG. 13, and characters belonging to the "メ" group are in the next position, and the remaining groups of characters according to the Japanese alphabet are arranged side by side across the remaining blocks in FIG. 12. Further, frequently used characters within the "ア" group in the blocks corresponding to keys are in the lower two rows, and less frequently used characters in the "ア" group are in the third and fourth rows from the bottom. In an arrangement of characters by pronunciation and according to their frequency of use, less frequently used characters are arranged in the fifth row of blocks such as in FIGS. 5–9, and in the sixth row (four characters in each sixth row) from the bottom of blocks such as in FIGS. 6 and 8. Blocks L.L.O. and L.R.O. in FIG. 5 and FIG. 12 will contain the least frequently used characters. By arranging characters according to the principles described above, it is possible to construct the character board for highly efficient operation, showing the effectiveness of the present invention, making good use of the frequency of use of the characters, and making it easy to look up characters according to their pronunciation or form.

FIG. 13 is a partial view of an example of character arrangement, taking into account the frequency of use, of characters according to the Japanese alphabet, using 48 key characters in first, second and third groups in the X column, and 52 key characters in first, second, third and fourth groups in the Y row in the table of FIG. 4. Eight code blocks in the left two rows and the code blocks in the extreme upper row in FIG. 12 have been omitted, and the upper row in each block has been shortened to four spaces, as illustrated in FIG. 13. The Y key character positions corresponding FIG. 6 and FIG. 7 are as illustrated in the "5" block in the L.L. blocks and in the "2" code block in the L.R. blocks. In FIG. 13, areas for characters in the order of the Japanese alphabet are indicated by dotted lines in the L.L. block; 25 characters in the "ア" columns, 55 in the "イ" columns, 12 in the "ウ" columns, 37 in the "エ" columns, 30 in the "オ" columns, 157 in the "カ" columns, and 37 in the "キ" columns. This example illustrates an arrangement wherein frequently used characters are arranged in the lower rows and less frequently used ones in upper rows in the "A" column.

Figure 14:
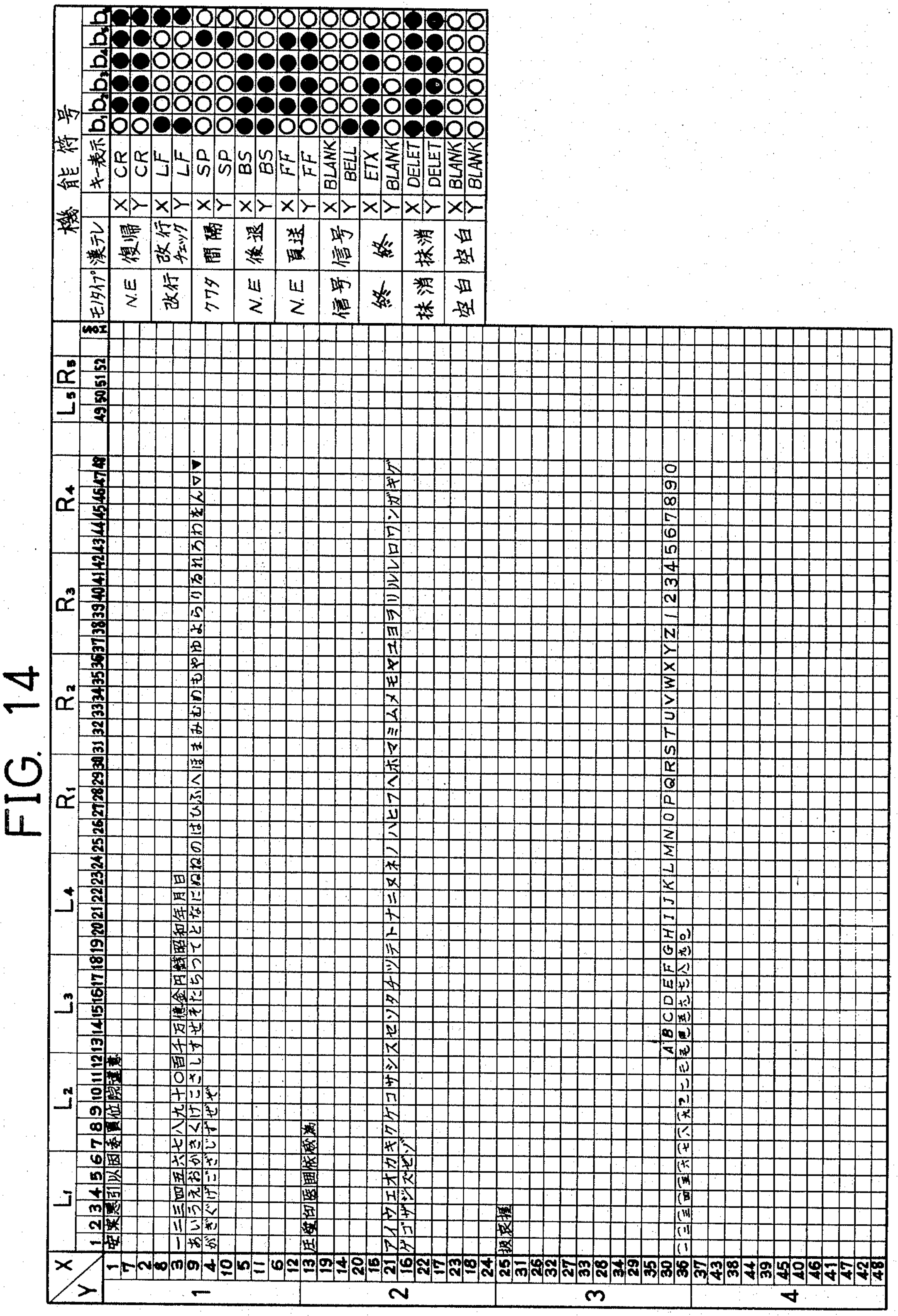
FIG. 14 shows a table of code to character arrangement and FIG. 15 illustrates a code for one Chinese character teleprinter now in use in Japan.
Figure 15:
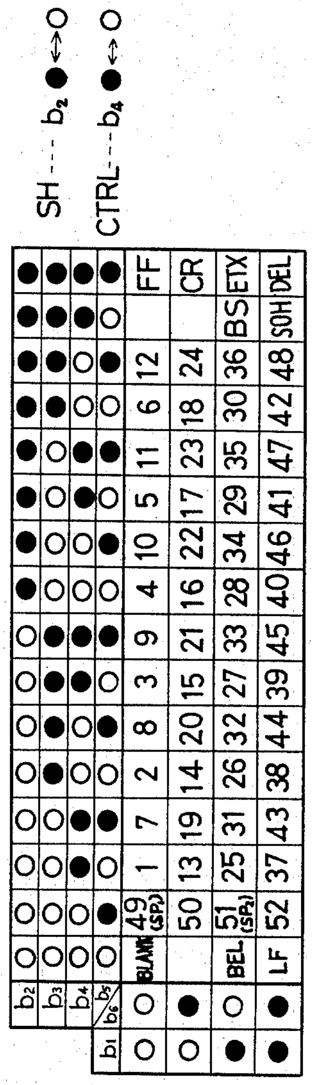

A detailed example of the present invention, mainly using the ISO code, has been described above. To clarify the scope of the present invention, applications of this invention to several systems now in use in Japan are described hereinafter. For the table of assigning key characters to Chinese characters for the Chinese character teleprinter presently used in Japan, generally three kinds of systems are widely used, that of the A newspaper company, that of the R news agency, and that of the T company. FIG. 14 is the table for assigning key characters to Chinese characters for the system of the A newspaper company, X indicating the first key character and Y the second key character, which is the same arrangement as the table for the ISO code. In this case, both the X and the Y key characters are used to produce six-element code units which are transmitted through a six-unit teleprinter line. FIG. 15 illustrates how six-element code units are correlated with the key characters in FIG. 14, there being six-element code units numbered 1 to 52 for the 52 key character codes. In FIG. 14, the key characters from FIG. 15 corresponding to different code units are represented by numbers 1 to 48, 49, 50, 51 and 52 in the X column, and numbers 1, 7, 2, 8, . . . , 42, 48 in the Y column. The sequences of key characters are different in the X and Y columns. In the system of the A newpaper company, a total of 2304 Chinese characters and symbols are classified into first, second, third and fourth classes according to the frequency of use, and the first, second, third and fourth groups in the Y column correspond to the first, second, third and fourth classes of characters and symbols, respectively, as indicated in FIG. 14. Characters in the same class are arranged according to the Japanese alphabet in groups beginning with the characters for the sounds A, I, U, E, and O, beginning in the upper row of the Y column in the direction of the key characters 1 to 48 in the X column, filling first the No. 1 row of the Y column and next the No. 2 row, etc. However, Japanese figures and especially frequently used Chinese characters and Japanese cursive characters are arranged at the center of the first class, i.e. the first or No. 1 group in the Y column, as indicated in the figure, Japanese square characters are arranged at the center of the second class, and Roman alphabet letters, figures and symbols at the bottom of the third class. As indicated in FIG. 14, function codes are also represented by combinations of the X and the Y key characters in this system. SOH at the end of the X column is an activation code used in the message switching system of the six-unit teleprinter line, which is an X key character in this system which can be combined with one of 48 Y key characters to indicate 48 address codes. 49, 50, 51 and 52 in the X row are used for an additional 192 Chinese characters, symbols or other characters as the occasion demands.

Figure 16:
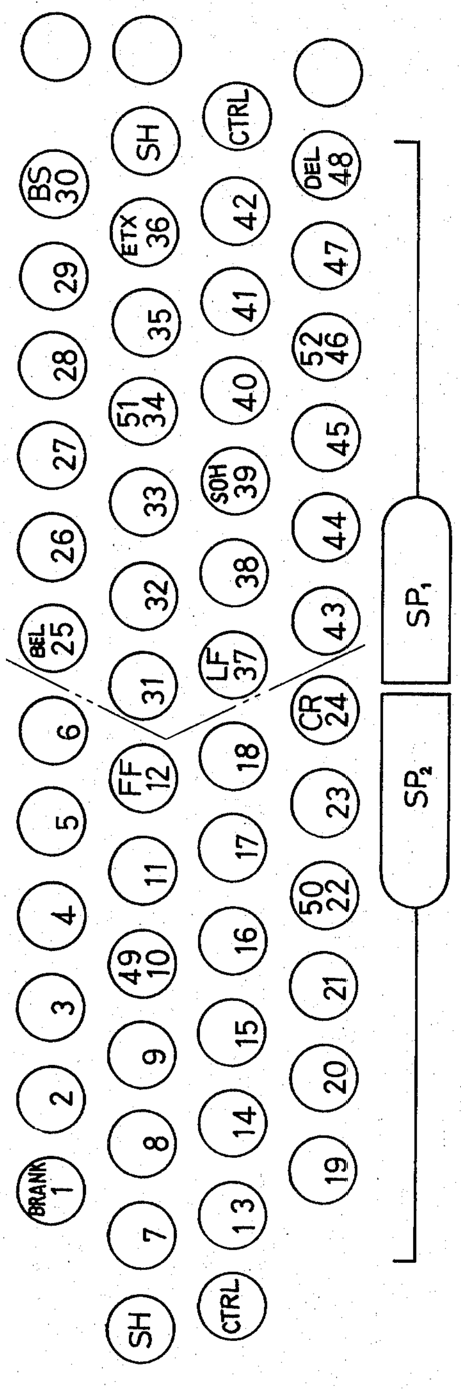
FIG. 16 illustrates an example of keyboard code arrangement of this invention corresponding to FIG. 14.
Figure 17:
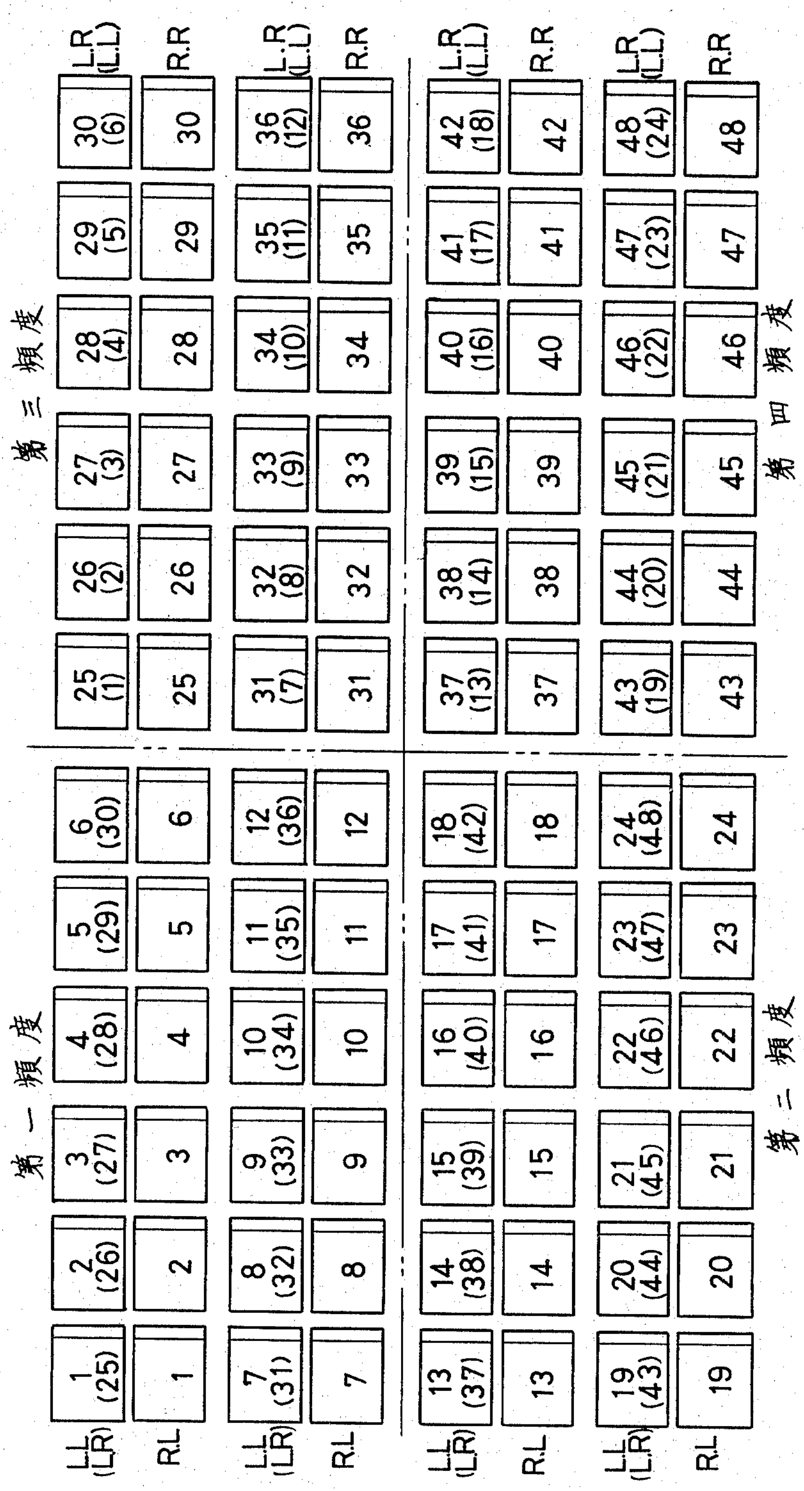
FIG. 17 and FIG. 18 illustrate an example of the type of character keys and the character arrangement of this invention corresponding to FIG. 14.

FIG. 16 and FIG. 17 illustrate an example of the keyboard and the character board for the table of key characters in FIG. 14 according to this invention. Keys are arranged as illustrated in FIG. 16 according to the relation between the code sequence and the sequence of key character arrangement in the X and Y columns in FIG. 14, and the character board corresponding to the keyboard is arranged as in FIG. 7, and the convenience and order illustrated in FIG. 16 and FIG. 17 are easily recognized, as described in detail hereinafter.

48 keys for producing code units are arranged as shown in FIG. 16, one for each of the key character numbers in FIG. 15. Although key characters 49, 50, 51 and 52 and SOH may be assigned to independent additional keys, where the number of keys is limited to 48, they are assigned to the keys for 10, 22, 34, 46 and 39, respectively, the code unit corresponding to the key characters 49–52 and SOH being produced by actuating the SH key at the same time respective keys 10,22,34, 46 and 39 are actuated. The function of the SH key is to convert code unit element *b2* in FIG. 15 to a space condition if it is a mark, and to a mark if it is a space. Code units for BLANK, FF, CR, BEL, BS, EXT, LF and DEL key characters are obtained by activating keys for 1, 12, 24, 25, 30, 36, 37 and 48, respectively while the CTRL key is actuated. The function of the CTRL key is to convert code unit b4 in FIG. 15 to a space condition if it is a mark, and to a mark if it is a space. Since the SH key and the CTRL key perform a similar function, code units for function key characters can be produced only when the SH key is actuated in combination with a key character key, as illustrated in FIG. 15. However, the CTRL key is provided to hinder the operation of the character counter when the CTRL key is actuated, since the character counter operates for character code units and the space code units only. The SP1 key and the SP2 key are provided exclusively to produce space code units, the reason for dividing the conventional space bar into two keys being described later. As function key characters in the table of FIG. 14 are also for producing two six-element code units, each function code having a corresponding X and Y key character and the two keys on the keyboard in FIG. 16 must be operated to produce each function code. Alternatively, function key exclusively for producing functions code units and mechanism for producing such code units can be added to the keyboard and associated apparatus in FIG. 16, which keys generate a function made up of two six-element code units by the actuation of the single key.

Figure 19:
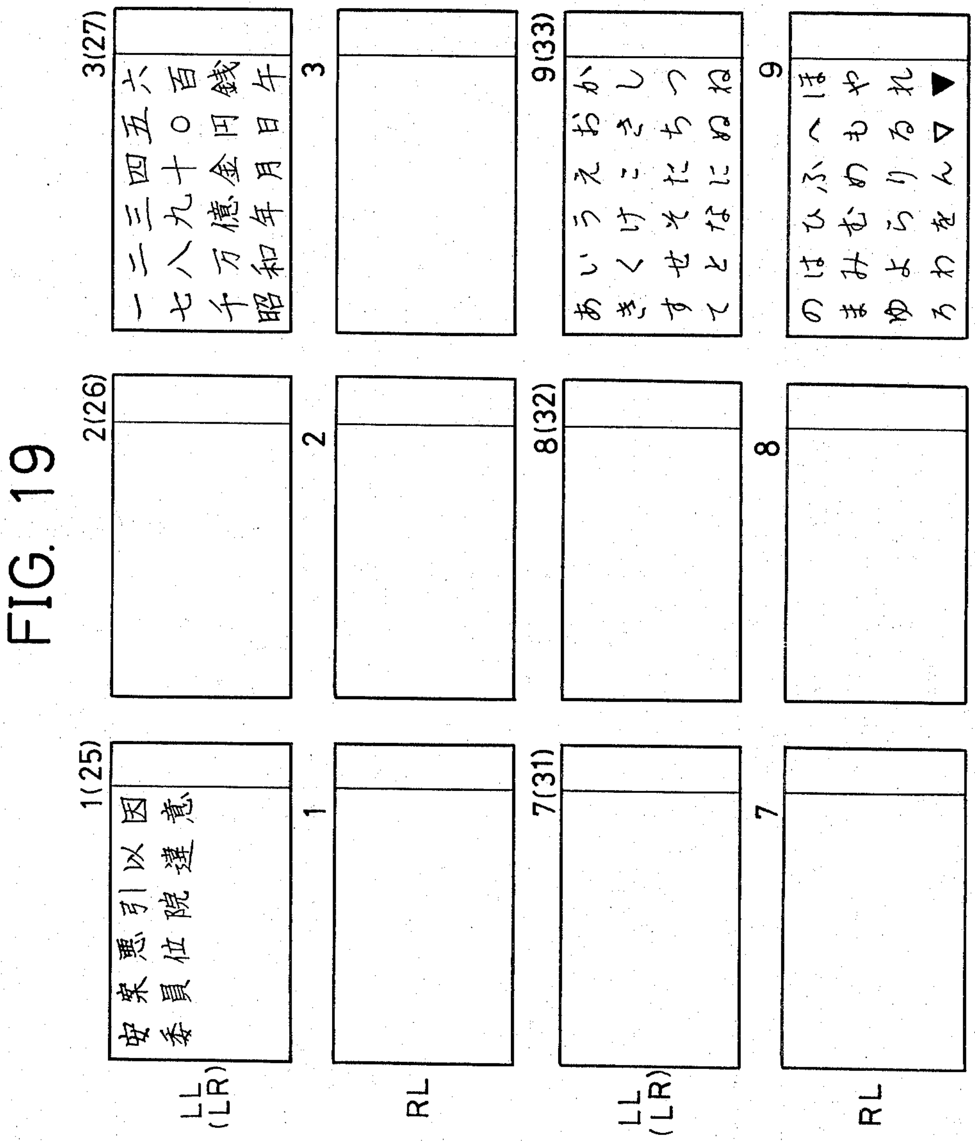
FIG. 19 illustrates a sectional example of the concrete character arrangement in FIG. 17 corresponding to FIG. 14.
Figure 18:
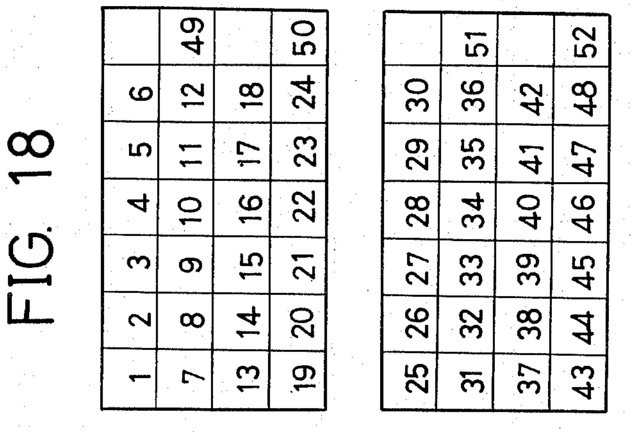

In FIG. 17 there is shown a character board with two sets of code blocks thereon numbered with sets of the same key characters, i.e. two blocks 1, two blocks 2, etc., and the blocks are arranged in positions corresponding to the keys in FIG. 16 having the same key characters. These numbers correspond to key characters in the Y column of the table in FIG. 14, which in that table are numbers. Within each block is an array of Chinese characters at positions designated by key characters in the X column of the table of FIG. 14 and also in the same arrangement as the positions of the key on the keyboard of FIG. 16, the upper blocks in one set of code blocks having characters arranged in the pattern of keys operated by the left hand of the operator, and the blocks in the other set having characters arranged in the pattern of keys operated by the right hand. In FIG. 14, the first class characters, according to frequency of use, are arranged in the first twelve rows. In FIG. 17, the first six characters from row 1 of FIG. 14, the L1 characters 1–6, are placed at the top of the block 1 in the upper left corner of the figure, as shown in FIG. 19, the second six characters from row 1, the L2 characters 7-12, are placed in the second line of the same block, as shown in FIG. 19, the third six characters in row 1, the L3 characters 13–18, are placed in the third row, and the fourth six characters, the L4 characters 19–24 are placed in the bottom row. These characters are accordingly arranged in the first block 1 in the manner so that their X column key characters are in the arrangement of the upper part of FIG. 18. The groups of characters R1, R2, R3 and R4 are arranged in the second block 1 in FIG. 17, so that their key characters are in the arrangement of the lower part of FIG. 18. The characters in the second row of the table of FIG. 14, row 7, are then arranged in the same manner in the blocks 7 in the upper left part of FIG. 17. The characters in the third row, the row with Y key character 2, are arranged in the blocks 2 in FIG. 18, and so on. The characters in the second class according to frequency of use are arranged in blocks 13 to 24, the third class in blocks 25 to 36, and the fourth class in blocks 37 to 48. The Chinese characters are therefore arranged on the character board of FIG. 17 systematically in sequence according to their frequency of use, which makes possible easy recognition of the positions of the keys to be operated on the keyboard of FIG. 16. For example, when the code units for the Chinese character having the X key character 17 are to be produced, the Chinese character will appear in the third row in the upper block 1 in FIG. 17, and in the fifth position in that row, the position indicated by the number 17 in FIG. 18, and this indicates to the operator that first key 17, which will be under the left hand in the third row and fifth position must first be actuated, and then, since the character is in a block corresponding to the "1" key, that the key 1 in the top row, first position, must then be actuated.

The drawback of the arrangement of the keyboard and the character board of FIGS. 16 and 17 is that for many of the most frequently used Chinese characters, the code unit is produced by actuating two keys with the left hand, i.e. all of the characters in the blocks 1–6, 7–12, 13–18 in the first set of blocks, are produced by actuating two keys with the left hand, which imposes a heavy burden on the left hand of the operator. This could be improved by distributing the burden between both hands. Where the X and Y key characters for the individual Chinese characters have already been established, the following system can be used to cause more frequent use of two hands to produce the code units for a Chinese character. An arrangement is provided such that when the first formed element $b_1$ of an X code unit is a space, the element $b_1$ of the Y code unit formed by the following key operation is converted automatically from a mark to a space, or from a space to a mark. For instance, as in the previous example, in FIG. 14, where the code units for the Chinese character at the intersection of X column 17 in the group of columns under L3 and row 1 in column Y are to be formed, the X code unit is formed by the operation of key "17" in FIG. 16, as in the previous explanation of key operation. As the result thereof, as seen in FIG. 15, the code unit corresponding to key character "17" is obtained. Since the element $b_1$ of this code unit is a space, with the automatic conversion arrangement upon the operation of a key to obtain the code unit for the Y code, irrespective of whichever character key is actuated, the element $b_1$ in the code unit obtained will be converted. Accordingly, it follows that, in order to obtain the desired Y code unit in the case just described, the operation of key "25" in place of key "1" in FIG. 16 is necessary. In this instance, however, the Y code unit obtained is not that corresponding to character "25" in FIG. 15, but because the element $b_1$ in the code unit for key "25" is automatically converted from a mark to a space, the code unit which is same as that for character "1" in FIG. 15, will be obtained. That is to say, for the purpose of obtaining the desired Chinese character, instead of two operations with the left hand, the key "17" first and then key "1", an X code unit and a Y code unit will be respectively obtained, which correspond to characters "17" and "1" in FIG. 15 by first operating key "17" with left hand and then key "25" with the right hand. In FIG. 17, this is shown by blocks designated LL on the left, namely, blocks 1–6 on the first row, blocks 7–12 in the 3rd row, blocks 13–18 in the 5th row, and blocks 19–24 in 7th row. The figures 25–30, 31–36, 37–42, 43–48 in parentheses denote that in order to obtain a Y code unit for Chinese characters contained in these blocks, the operation of a key among the right hand keys of 25–48 corresponding to the number in parentheses in place of a key in keys 1–24 will be sufficient. In FIG. 17, the blocks indicated by LR on right side, namely, the blocks for characters of the third and fourth frequencies, the order will be the reverse of the above, that is, the conversion is made from the operation of LR to LL; namely, to operation twice with left hand. As for the space code unit, for the purpose of forming a double code unit, code units corresponding to characters 49 and 51 in FIG. 15 are formed by operation of key $SP_1$ and $SP_2$ in FIG. 16. However, because the element $b_1$ of the code unit for 51 is converted, two code units corresponding to "49" will be obtained. This is the same as the desired space code units which are indicated in the functional key character column on the right side of FIG. 14. In addition, as the other functional key characters all require simultaneous operation such as the CTRL key, during the time the CTRL key is in operation, the functions of the additional device for carrying out the automatic conversion of element $b_1$ in the above-mentioned Y code unit will have to be stopped. A detailed explanation of an additional device to convert the double operation of keys corresponding to characters in the LL blocks for the first and second frequencies to alternate operation by both hands will be described hereinafter.

Figure 20:
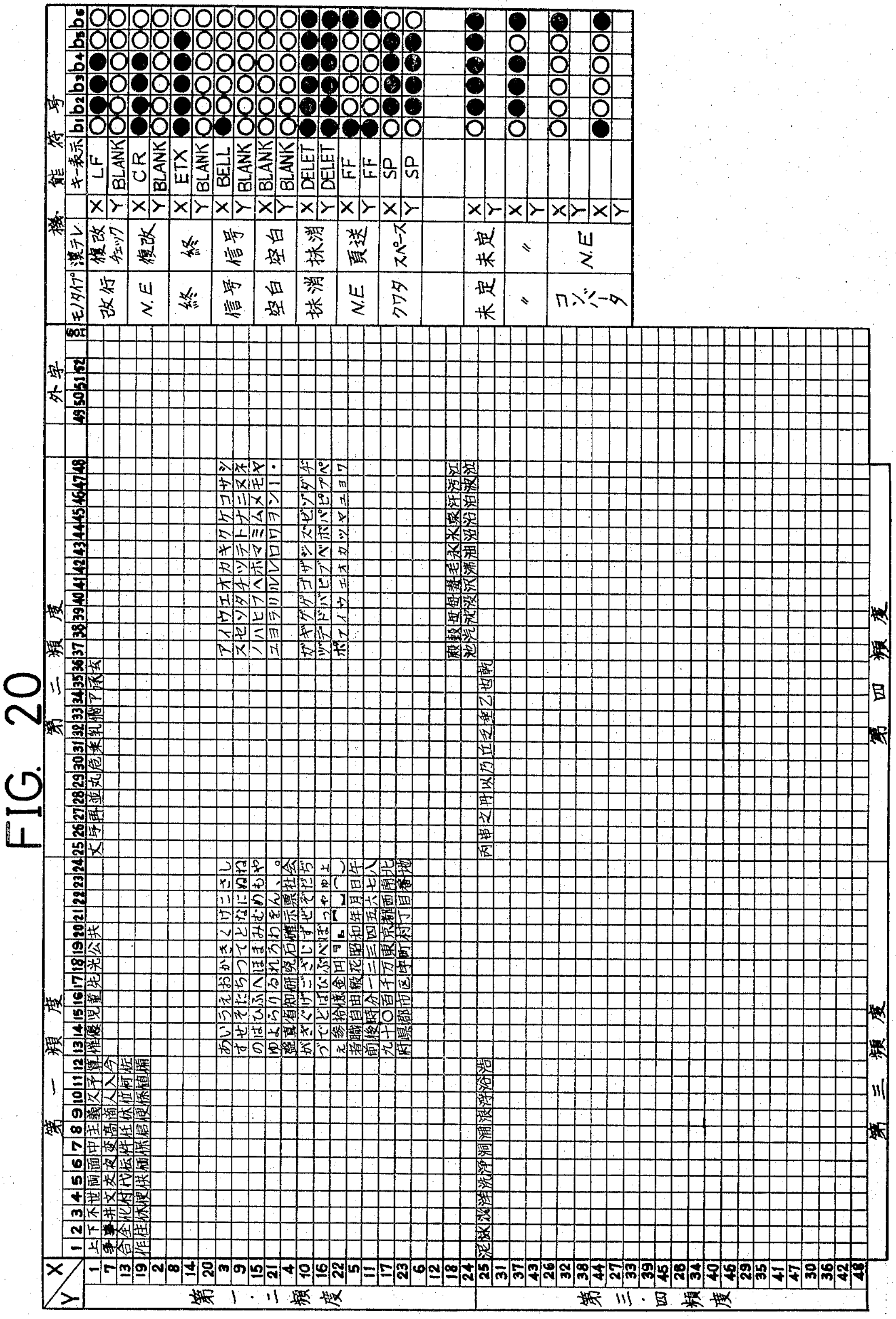
FIG. 20 shows a code to character arrangement and FIG. 21 shows a code for another Chinese character teleprinter now in use in Japan.
Figure 21:
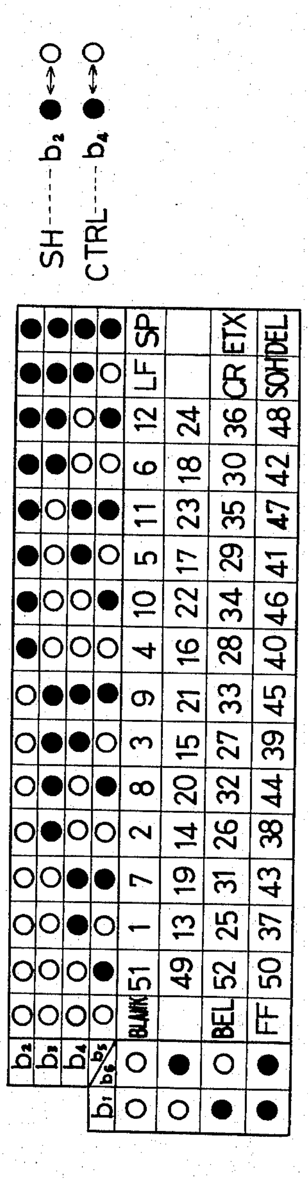
Figure 22:
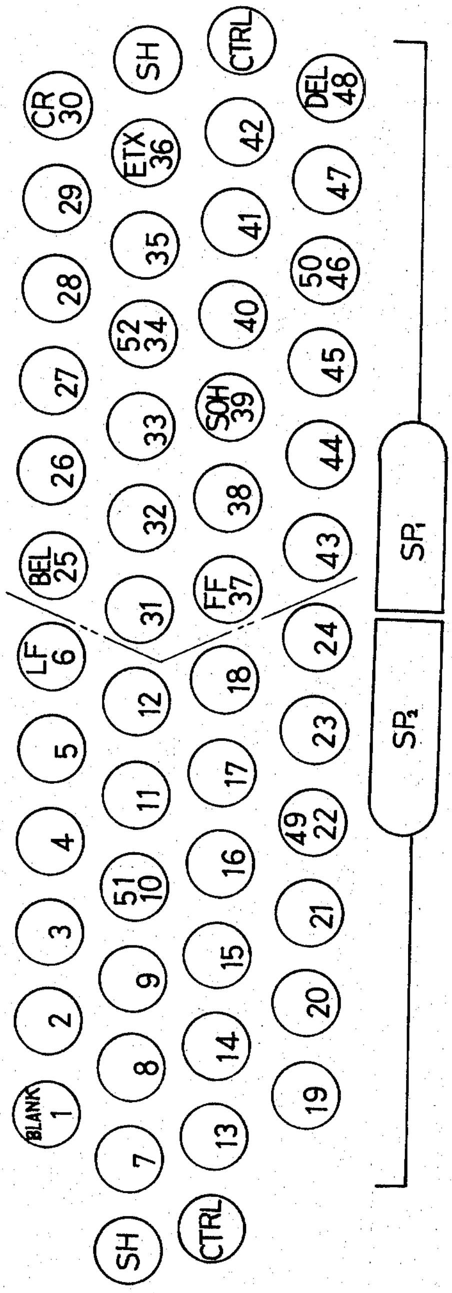
FIG. 22 illustrates an example of the keyboard code key arrangement of this invention corresponding to FIG. 20.
Figure 23:
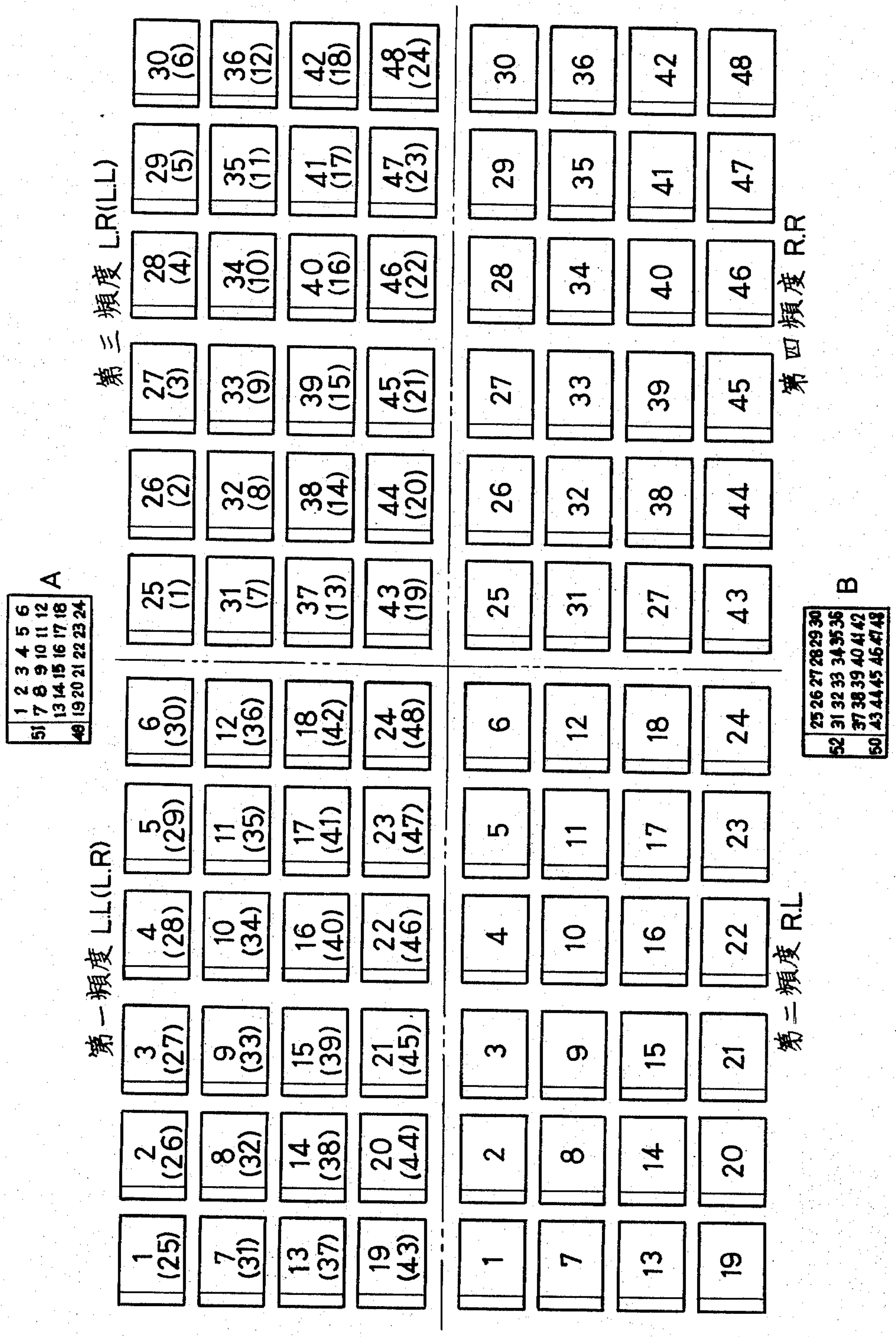
FIG. 23 and FIG. 24 illustrate an example of the type of character board and the arrangement of characters of this invention corresponding to FIG. 20 and FIG. 22.
Figure 25A:
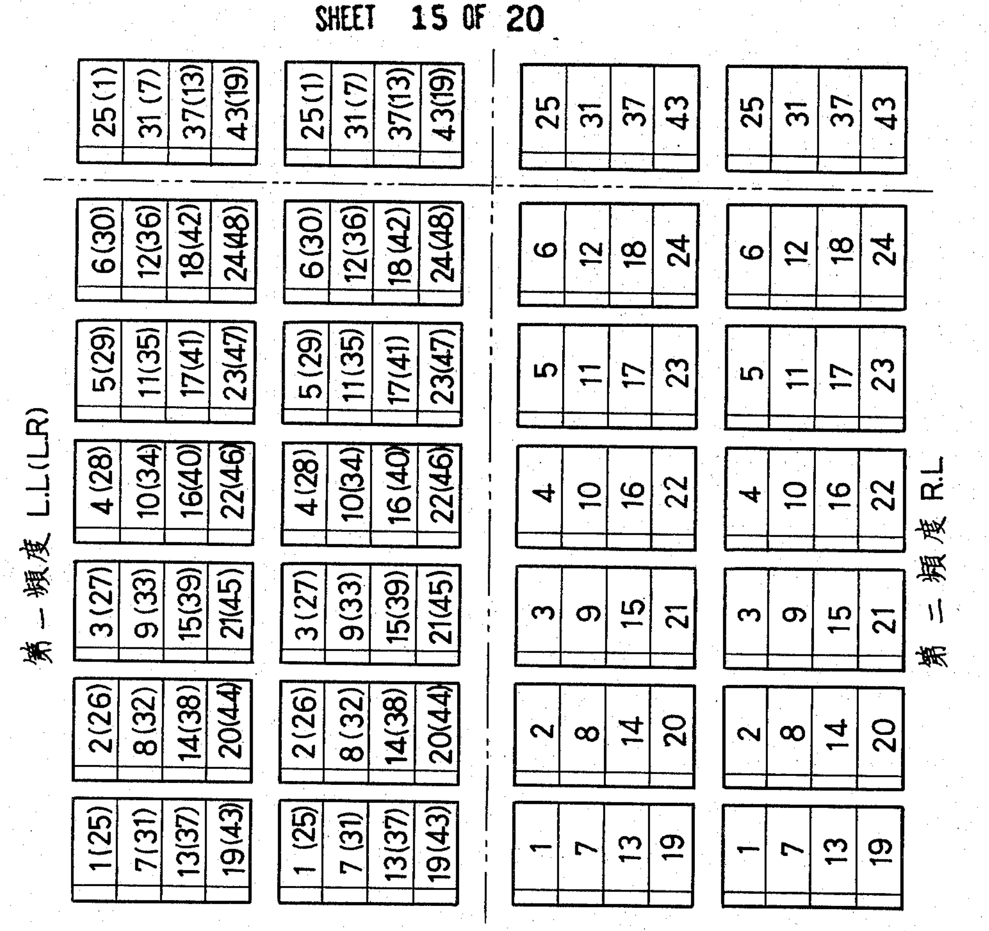
FIG. 25 and FIG. 26 illustrate an example of a modification of FIG. 23.
Figure 24:
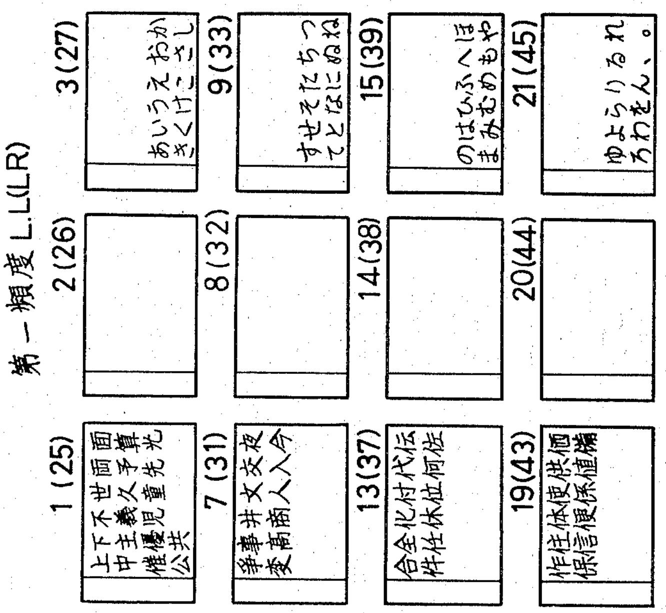
Figures 25B, 26, 27:
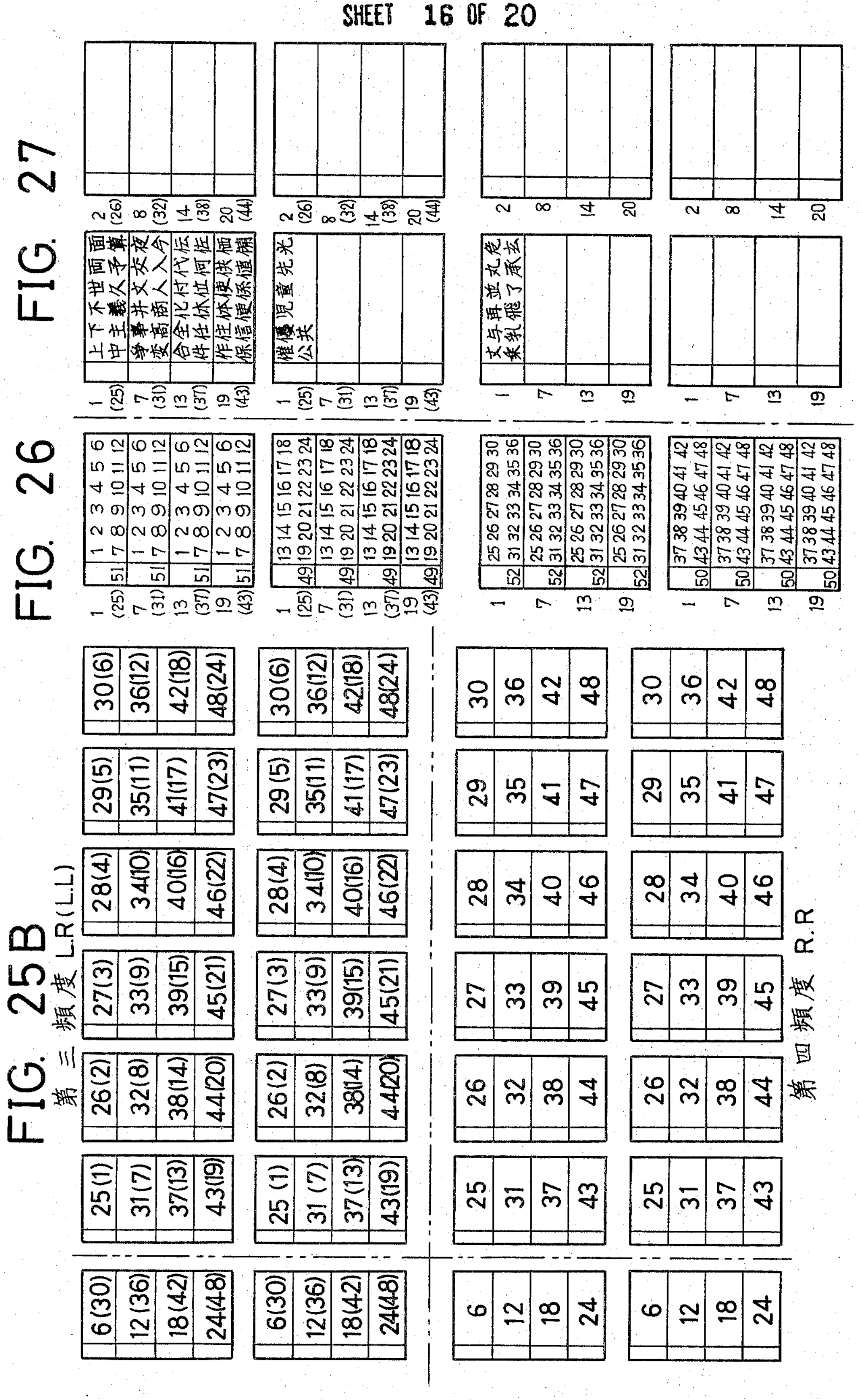
FIG. 27 illustrates partially a concrete example of character arrangement in FIG. 25 corresponding to FIG. 20.

In FIG. 20 there is shown a table for assigning key characters to the Chinese character teleprinter system now in use between the K news agency and related newspaper companies, the key character to code unit table being shown in FIG. 21. FIG. 22 is a keyboard having the keys arranged according to the present invention for use with the key characters according to the table of FIG. 20, while FIGS. 23 and 24 show a character board and parts thereof for use with the keyboard of FIG. 22, and another modification is shown in FIGS. 25–27. FIG. 20 and FIG. 21 are similar to FIG. 14 and FIG. 15 with the following differences:

First, the sequence of the key characters in the Y column is 1, 7, 2, 8, 3, 9, 4, 10 . . . in FIG. 14, while the sequence is 1, 7, 13, 19, 2, 8, 14, 20 . . . in FIG. 20; second, in FIG. 14, Chinese characters are classified in four classes with respect to only the Y column, while in FIG. 20 the Chinese characters are divided into two groups with respect to the X row and two further groups with respect to the Y column, the four parts of the table being assigned to the first, second, third and fourth class, respectively as illustrated in the figure; third, the code units for key characters 49, 50, 51 and 52 in the additional charter column in the X row in FIG. 20 are reversed in FIG. 21 as clearly seen from the figure; fourth, different function key characters are provided; fifth, the sequence of Chinese character arrangement is based on the configuration of the characters, and the X row key characters are divided into four groups of 1 to 12, 13 to 24, 25 to 36 and 37 to 48, while the Y key character column is divided into twelve groups each of which has four rows, such as 1, 7, 13, and 19. For the first class of characters according to frequency of use, for example, the part of the table has groups composed of 48 spaces, e.g. spaces 1 to 12 of the X key character row in each of rows 1, 7, 13, and 19 of the Y key character column. The sequences of groups is: spaces 1 to 12 of the X row in each of rows 1, 7, 13 and 19 of the Y column; spaces 13 to 24 of the X row in each of rows 1, 7, 13 and 19 of the Y column, spaces 1 to 12 of the X row in each of rows 2, 8, 14 and 20 of the Y column, etc. The sequence of groups for the first class and the start of the second class is according to the following table:

| Group | X row | Y column | Class |
|---|---|---|---|
| 1 | 1 - 12 | 1, 7, 13, 19 | The First Class |
| 2 | 13 - 24 | " | |
| 3 | 1 - 12 | 2, 8, 14, 20 | |
| 4 | 13 - 24 | " | |
| 5 | 1 - 12 | 3, 9, 15, 21 | |
| 6 | 13 - 24 | " | |
| 7 | 1 - 12 | 4, 10, 16, 22 | |
| 8 | 13 - 24 | " | |
| 9 | 1 - 12 | 5, 11, 17, 23 | |
| 10 | 13 - 24 | " | |
| 11 | 1 - 12 | 6, 12, 18, 24 | |
| 12 | 13 - 24 | " | |
| 13 | 25 - 36 | 1, 7, 13, 19 | The Second Class |
| 14 | 37 - 48 | " | |
| 15 | 25 - 36 | 2, 8, 14, 20 | |
| 16 | 37 - 48 | " | |

For the second, the third and the fourth class frequent characters are arranged in a sequence similar to the first class. The arrangement of keyboard keys in FIG. 22 corresponding to the key character arrangement described above is most convenient; the character board in FIG. 23 corresponding to the key arrangement in FIG. 22 is reasonable; FIG. 24 is a view of part of the character board for a part of characters from the table in FIG. 20. Although positions of characters in the character board in FIG. 23 and FIG. 24 are most convenient to recognize positions of keys for the production of the code units from the X and Y key characters, the sequence of the blocks for convenience in looking up characters being, for example, in regard to the blocks for Y key characters, 1, 7, 13 and 19 (in FIG. 24) for Chinese characters in the first class, the upper two rows in blocks 1, 7, 13 and 19 being arranged sequentially, and next the lower two rows in the same manner. Therefore by giving priority to the sequence of character arrangement, the blocks in the character board of FIG. 23 can be rearranged to the positions as in FIG. 25, FIG. 26 and FIG. 27. That is, FIG. 25 illustrates an arrangement emphasizing correspondence between Y key characters and blocks for the recognition of the Y key character by the character position; FIG. 26 illustrates an arrangement emphasizing correspondence between the character position and the X key character in a vertical set of character blocks in FIG. 25. FIG. 27 is a partial view of a concrete example of the character board of FIG. 25 and FIG. 26, showing a character board with the systematic character arrangement. As described above, the keyboard in FIG. 22 can be used with the character boards in FIG. 23, FIG. 25 and FIG. 26, offering flexibility in devising an effective character board for the convenience of operators, which is the great characteristic of this invention.

A serious defect in FIG. 20 and FIG. 23 is that the code unit for the first class characters are produced by use of the left hand only, because of the key character arrangement, which is the same as in the system used by the A newspaper company. In the system of the K news agency, this serious problem could be avoided if the positions of the first class part and the second class part of the table of FIG. 20 were reversed. However, this defect must be overcome by technical means, because the table of FIG. 20 is now in use. This is done, as described above, by providing a means associated with the keyboard apparatus to convert the b1 element of the Y code unit to a space or to a mark (the means for doing this will be described hereinafter) only when the *b*1 element of the X code unit for character codes and the space code is a space, whereupon the code units produced are for the key characters indicated in parentheses in FIG. 23. If the said means is used, all the keys of the keyboard in FIG. 22 produce code units for key characters and the space key character when the SH key and the CTRL key are not actuated. Since the b1 element of the code unit for the space function is a space in the code unit for both the X and the Y code units for a space function, the X code unit for a space function is produced by operating the SP1 key with the right hand and then the Y code unit is produced by operating the SP2 key with the left hand. The SH key which converts the *b*2 code element from a space to a mark or a mark to a space in FIG. 21, is used in combination with keys 10, 22, 34, 39, 46 to generate code units for the key characters 49, 50, 51, 52 and SOH (the activation code). Further, the CTRL key when actuated converts the b4 element from a space to a mark or a mark to a space, and prevents the change of element *b*1 in the Y code element from a mark to a space only when the b1 element in the X code is a space, and generates function code units for key characters BLANK, LF, BEL, CR, EXT, FF and DEL in combination with keys 1, 6, 25, 30, 36, 37 and 48 respectively.

Figure 28:
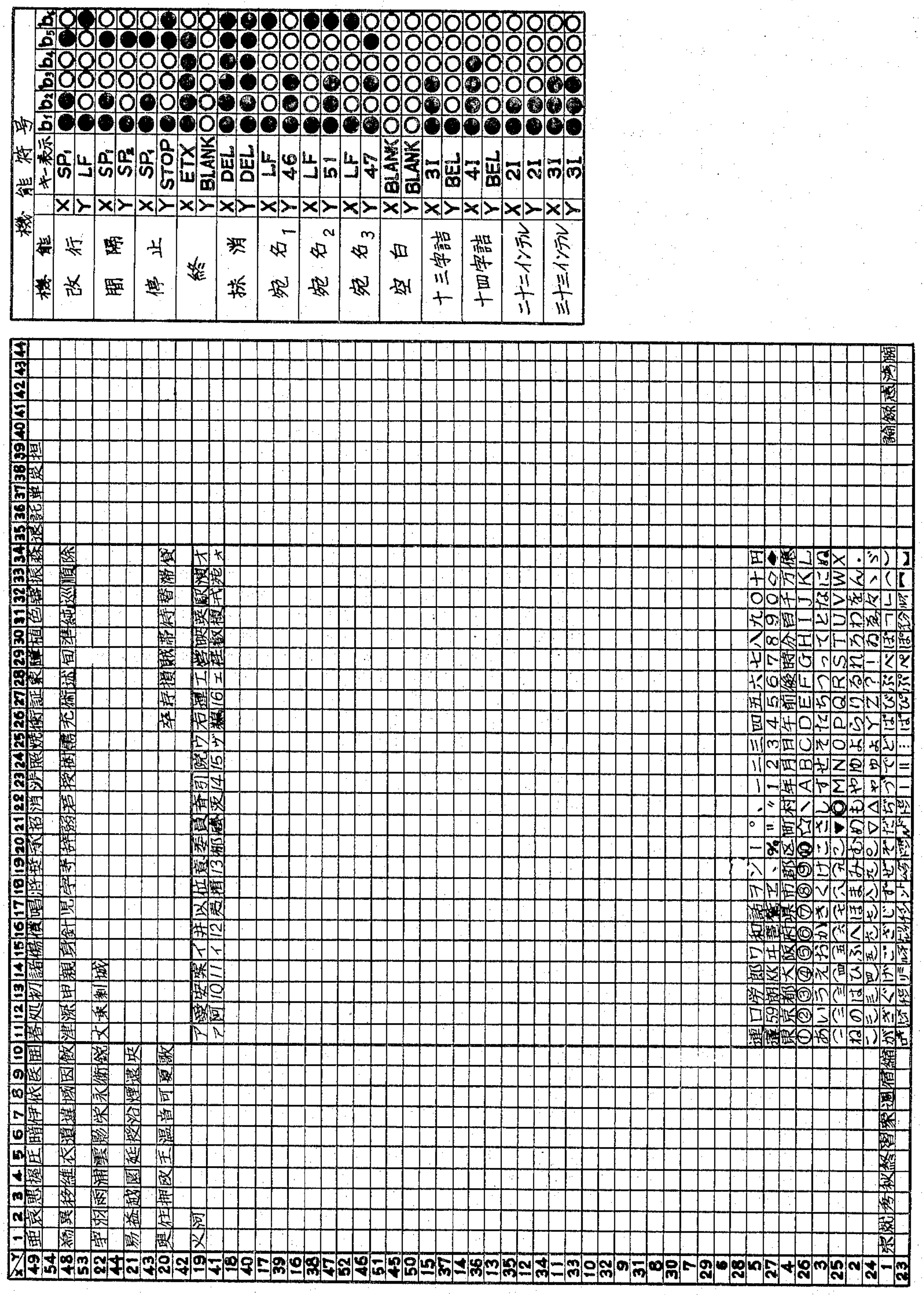
FIG. 28 shows a table of code to character arrangement and FIG. 29 shows a code for a third Chinese character teleprinter now in use in Japan.
Figure 29:
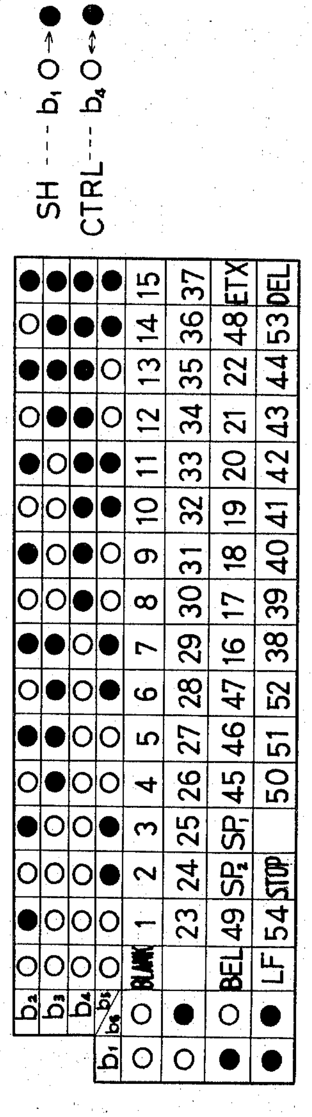
Figure 30:
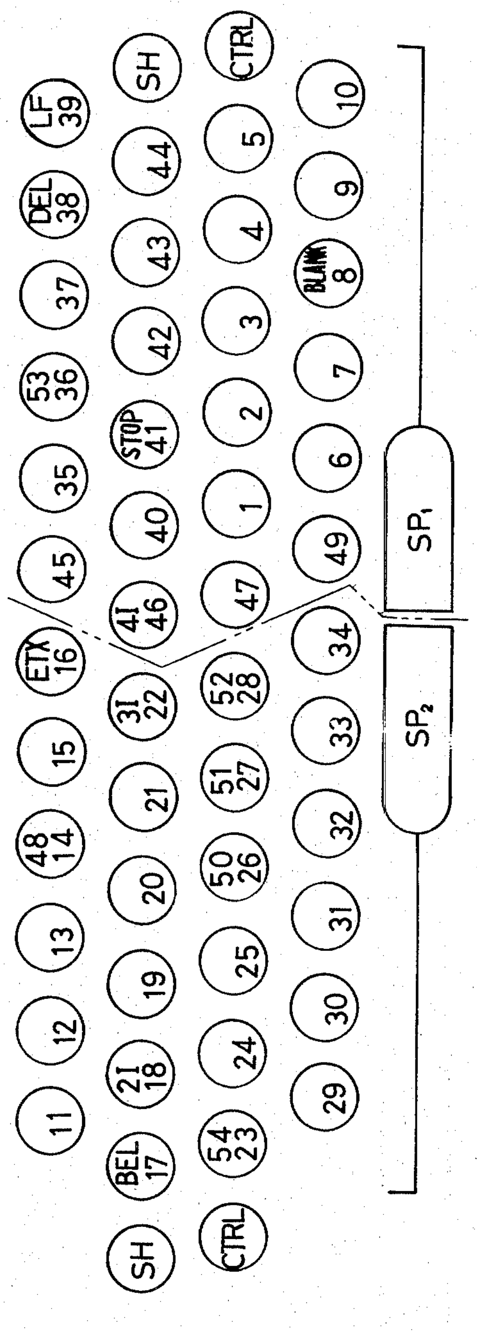
FIG. 30 illustrates an example of the keyboard code key arrangement in this invention for FIG. 28.

FIGS. 28 to 36 illustrate an example of the application of the present invention to the arrangement for a full automatic monotype made by the T factory. That is, FIG. 28 illustrates the table for assigning key characters to Chinese characters for the full automatic monotype made by the T factory, wherein each key character in the X and the Y columns indicated by a number corresponds to a six-element code unit according to the table in FIG. 29. Corresponding six-element code units for function characters in FIG. 28 are indicated in FIG. 29 by symbols in the "character key" columns. FIG. 30 shows an example of the arrangement of keyboard keys of the present invention for use with the table of FIG. 28, and FIG. 31, FIG. 32, FIG. 33 and FIG. 34 illustrate character boards based on this modification. The relation between FIG. 28 and FIGS. 30–34 is described in detail hereinafter. In FIG. 28, X key characters for producing the first code units for Chinese characters are arranged in a vertical row, and Y key characters for producing the second code units are arranged in a horizontal row. The Chinese character arrangement in FIG. 28 is as follows: Y key characters 1 to 10 constitute a first group, key characters 11 to 34 a second group, and 35 to 44 a third group, and key characters are arranged in numerical sequence in the Y row. The X key characters in the vertical column are arranged in numerical sequence on every other line, starting at the bottom with 23, 1, 24, 2, 25, 3, etc. up to 44. However, there are 54 spaces in the vertical column, while the horizontal Y row has 44 spaces, i.e. there are 44 columns corresponding to the Y key characters. To fill these spaces, spaces 45, 46, 47 and 49 are added to the sequence of spaces 1 to 22, and spaces 50, 51, 52, 53 and 54 are added to the sequence of spaces 23 to 44, respectively, as illustrated in the Figure. The rows corresponding to the X key characters are classified into two groups, rows 1 to 22, 45, 46, 47, 48 and 49, and rows 23 to 44, 50, 51, 52, 53 and 54, frequently used characters being contained in the former rows and less frequently used characters being in the latter rows. Also the former and the latter rows are further subdivided into spaces for the group of Y key characters 11 to 34 for X key character rows 1 to 19, 45, 46, 47, 23 to 41, 50, 51 and 52, and the remainder of the spaces, frequently used characters being contained in the former and less frequently used characters in the latter. They are classified into four classes according to the frequency of use.

| | Rows | Spaces |
|---|---|---|
| The First Class | X 1 – 19, 34, 46, 47 | Y 11 – 34 |
| The Second Class | X 1 – 22, 45, 46, 47 48, 49 | Y 1 – 10, 35 – 48 |
| | X 20, 21, 22, 48, 49 | Y 11 – 34 |
| The Third Class | X 23 – 44, 50, 51, 52 53, 54 | Y 1 – 10, 35 – 48 |
| | X 42, 43, 44, 53, 54 | Y 11 – 34 |
| The Fourth Class | X 23 – 41, 50, 51, 52 | Y 11 – 34 |

Figure 31:
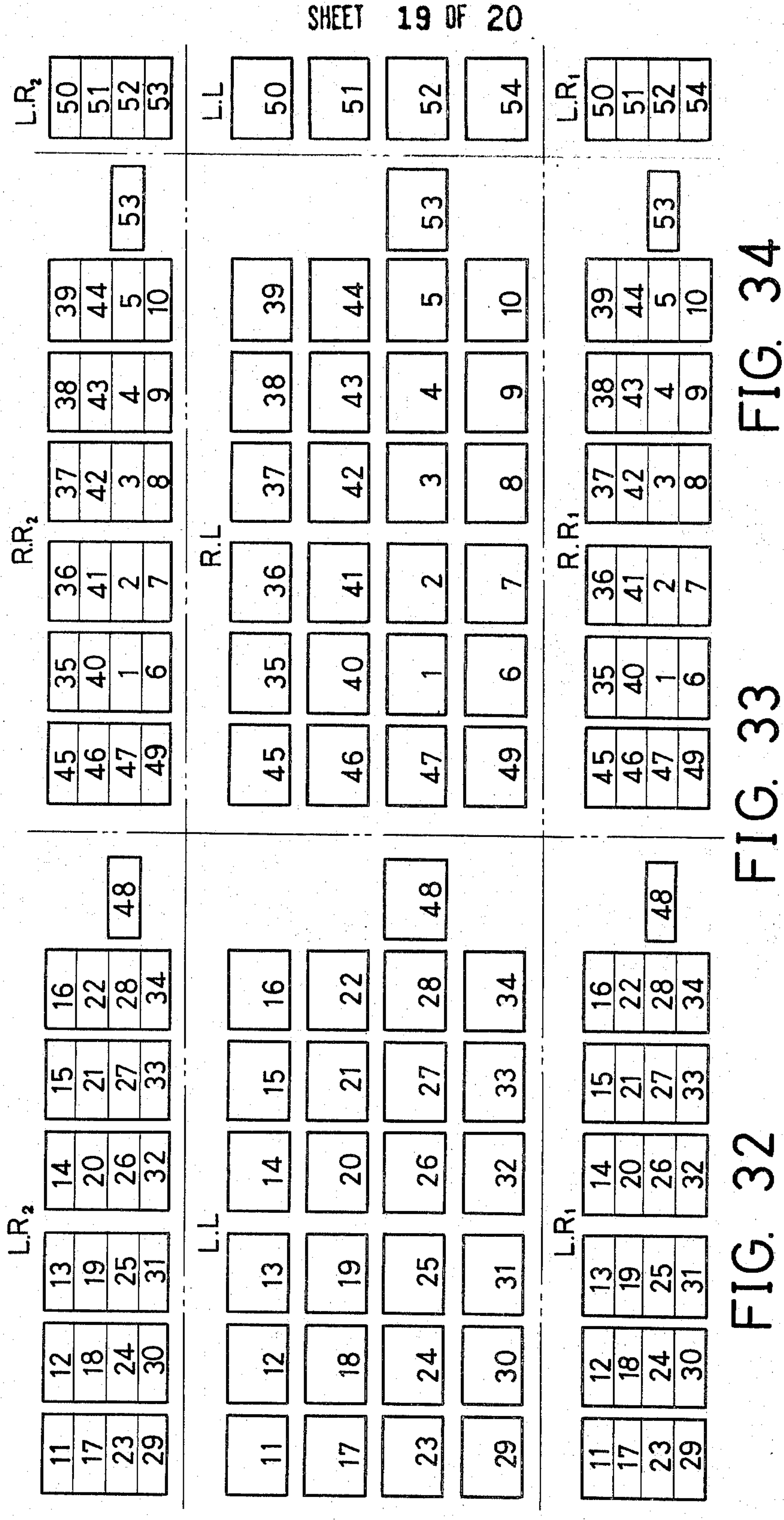
FIG. 31, FIG. 32, FIG. 33 and FIG. 34 illustrate an example of the form of character board and the arrangement of the sequence of characters in this invention for FIG. 28 and FIG. 30.

For the table described above, the key arrangement in FIG. 30 and the character board in FIG. 31 are used. FIG. 30 illustrates a keyboard arrangement wherein there are 48 character keys and two space function keys, the code units for the remaining key characters being produced by activating the SH key and a character key and function code units being produced by actuating the CTRL key and a character key. However, code units produced by use of the SH key or the CTRL key can instead be produced by a single key by increasing the number of keys, and the principle of the present invention is still applicable.

In FIG. 30 the keys are arranged so as to give priority to the Y key characters in the sequence of key operations to produce code units for a Chinese character. The 24 keys for the Y key characters for the first class, Y key characters 11 to 34, are placed so as to be operated by the left hand only. Keys corresponding to Y key characters 1 to 10 and 35 to 44 are placed so as to be operated by the right hand, and keys for the key characters 1 to 10 are arranged in the two lower rows for easy right hand operation, because the same numbered X key characters are for especially frequently used Japanese cursive characters and some Chinese characters in the first class, as is seen from FIG. 28. The rest of the keys are 45, 46, 47 and 49. Three of them, 45, 46 and 47 which are for producing code units for first class characters, are positioned as illustrated in FIG. 30, which facilitates looking them up on the character board in FIG. 31. In FIG. 30, the keyboard apparatus has means operated by the SH key to convert the b1 code element from the space condition to a mark, which as can be seen from FIG. 29 results in producing code units for key characters 48, 50, 51, 52, 53 and 54 when keys for key characters 14, 26, 27, 28, 36, and 23, respectively, are actuated. The keybaord apparatus further has means operated by the CTRL key to convert the *b*4 code element from a mark to a space condition or from the space condition to a mark, which causes function code units for function characters BLANK, ETX, BEL, 21, 31, DEL, LF, STOP, and 41 to be produced when keys for key characters 8, 16, 17, 18, 22, 38, 39, 41, and 46 are actuated. The complete two-part code units for a function, as illustrated in FIG. 28, have two code units, i.e. an X and a Y code unit, so that a complete function is also generated by operating two keys on the keyboard, or one key twice. The code units for a space function are generated by the alternative operation of the two space keys SP1 and SP2 in FIG. 30. The code units for a line feed function are generated by actuating the SP1 key and then, with the CTRL key actuated, the key 39. Code units for other functions are generated by operating keys in the sequence of the key and function characters in FIG. 28.

Figure 32:
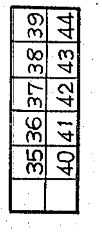
Figure 33:
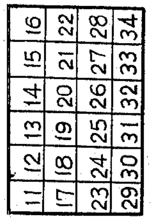
Figure 34:
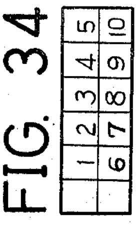
Figures 35, 36, 37:
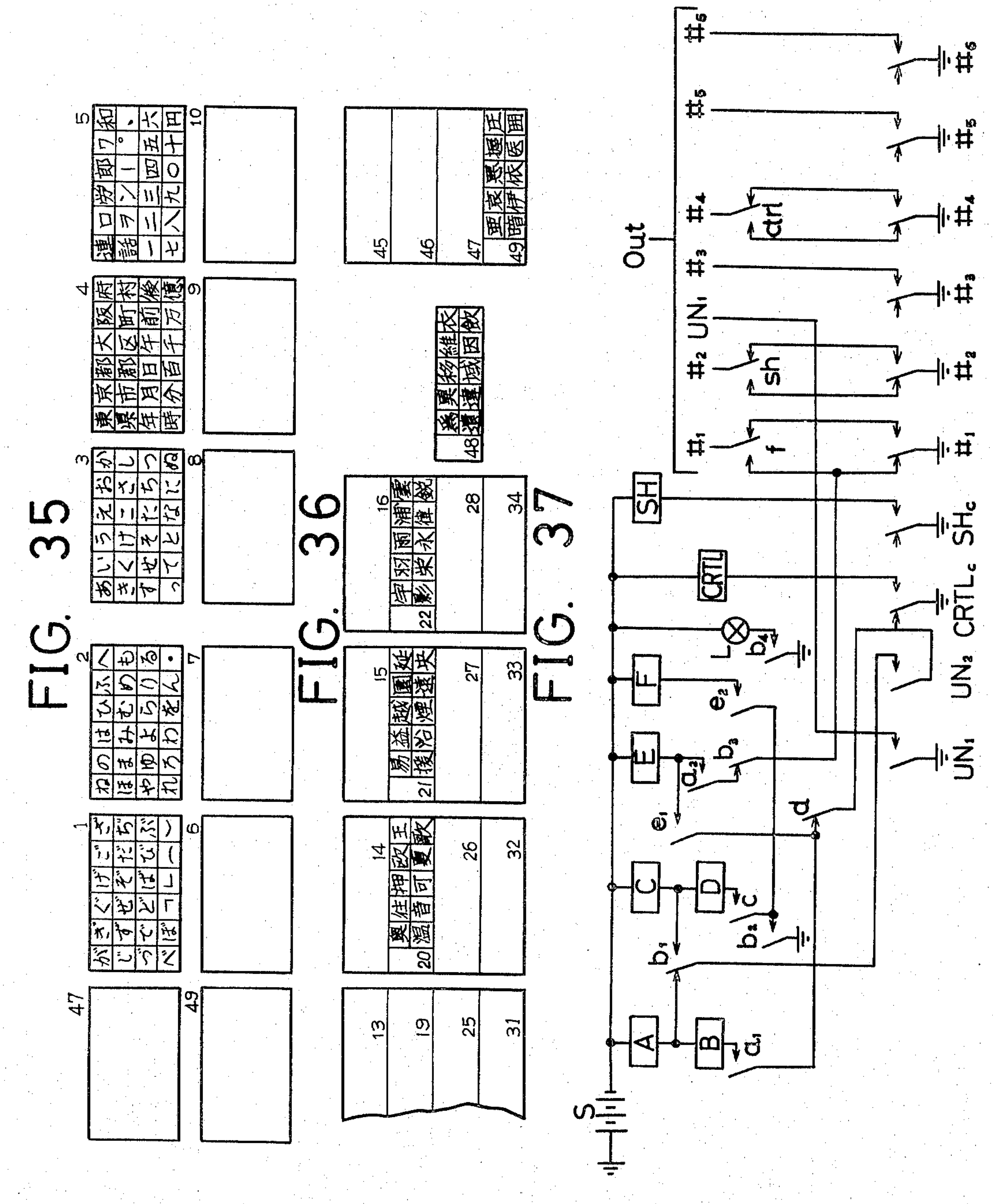
FIG. 35 and FIG. 36 partially illustrates a concrete example of the character arrangement of the character board in FIG. 31 corresponding to FIG. 28.
FIG. 37 illustrates an example of the supplemental equipment refered to in the process from FIG. 14 to FIG. 19 and from FIG. 20 to FIG. 27.

FIG. 31 illustrates an example of the antithesis between codes and character arrangement for the table of FIG. 28 and the key arrangement of the keyboard in FIG. 30 based on the present invention. The numbers in each block in FIG. 31 correspond to the X key characters in the vertical column in FIG. 28, and the blocks in each part of the character board are in the same arrangement as the corresponding numbered keys on the keyboard in FIG. 30. Chinese characters are positioned in each block according to the Y key characters in the horizontal rows in FIG. 28. The blocks in the upper rows in FIG. 31 indicated by L.R2 and R.R2 have Chinese characters arranged therein in the position of Y key characters therefor as in FIG. 32. The blocks in the middle row in FIG. 31 indicated by L.L. and R.L. have Chinese characters arranged therein in the pattern of Y key characters therefor as seen in FIG. 33. The blocks in the lower row in FIG. 31 indicated by L.R. and R.R1 have Chinese characters arranged therein in the pattern of Y key characters therefor as in FIG. 34. In regard to the correspondence between FIG. 31 and the key arrangement in FIG. 30, operators must remember the positions of key corresponding to blocks for key characters 48, 50, 51, 52, 53 and 54 which are operated in combination with the SH key in FIG. 30, because the position of these keys does not correspond to the positions for these blocks in FIG. 31. However, positions of the keys for any other X key characters and Y key characters are easily recognized by the positions of the Chinese characters in the blocks in FIG. 31. Further, blocks 50 to 54 relate only to the third and fourth class characters and do not have the Y key characters with the exception of block 48 which relates to the second class characters. The Chinese character arrangement in FIG. 31 is as follows: the blocks in the lower part indicated by L.R1 and R.R1 correspond to the spaces 1 to 10 in the horizontal rows in FIG. 28, the blocks in the middle part indicated by L.L. and R.L. correspond to spaces 11 to 34 in the horizontal rows, and the blocks in the upper part indicated by L.R2 and R.R2 correspond to spaces 35 to 44 in the horizontal rows. As illustrated in FIGS. 32, 33 and 34, Chinese characters having X key characters in the lower ten rows, those having X key characters in the middle 24 rows, and those having X key characters in the upper ten rows are arranged from the left to the right and from the top to the bottom. An example of this arrangement is illustrated in FIG. 35 for Chinese characters having key characters in the middle rows 1, 2, 3, 4 and 5, and in FIG. 36 for Chinese characters having key characters in the lower rows 49, 48, 22, 21 and 20. As clearly seen from FIG. 35, the sequence of Chinese characters based on their pronunciation is the inverse of the sequence of the X key characters, which results in an unnatural arrangement of character blocks in FIG. 31 corresponding to X key characters, which is inevitable if the table in FIG. 28 is used. Blocks for X key characters in each class according to the sequence of the character arrangement are as follows:

| CLASS | ROW | Y SPACES |
|---|---|---|
| The First Class | Middle Row | **19, 18, 17, 16, 47, 46, 45, 15, 14, 13, 12, 11, 10, 9, 8, 7, 6, 5, 4, 3, 2, 1** |
| The Second Class | Lower Row | **49, 48, 22, 21, 20, 19, 18, 17, 16, 47, 46, 45, 15, 14, 13, 12, 11, 10, 9, 8, 7, 6, 5, 4, 3, 2, 1** |
| | Middle Row | **49, 48, 22, 21, 20** |
| | Upper Row | **49, 48, 22, 21, 20, 19, 18, 17, 16, 47, 46, 45, 15, 14, 13, 12, 11, 10, 9, 8, 7, 6, 5, 4, 3, 2, 1** |
| The Third Class | Lower Row | **54, 53, 44, 43, 42, 41, 40, 39, 38, 52, 51, 50, 37, 36, 35, 34, 33, 32, 31, 30, 29, 38, 27, 26, 25, 24, 23,** |
| | Middle Row | **54, 53, 44, 43, 42** |
| | Upper Row | **54, 53, 44, 43, 42, 41, 40, 39, 38, 52, 51, 50, 37, 36, 35, 34, 33, 32, 31, 30, 29, 38, 27, 26, 25, 24, 23,** |
| The Fourth Class | Middle Row | **41, 40, 39, 38, 52, 51, 50, 37, 36, 35, 34, 33, 32, 31, 30, 29, 28, 27, 26, 25, 24, 23** |

In FIG. 31, the most frequently used Chinese characters in the first class having X key characters 1, 2, 3, 4 and 5 are collected so that the X code unit therefor is most easily produced by operating a key with the right hand and the Y code unit is produced by operating a key with the left hand.

The apparatus for overcoming the defect that code units for half the characters belonging to the first and second classes (FIG. 17) or for all the characters belonging to the first class (FIG. 23) must be produced by operating keys twice with either the right or the left hand, which was previously pointed out in the explanation of FIGS. 17 and 23, is described hereinafter.

The apparatus comprises a device having means to distinguish between the first code unit and the second code unit for Chinese characters, symbols, and function codes, means to detect the condition, either a mark or a space condition, of a particular code element of the first code unit of a pair of code units, and means to convert the condition, a mark or a space, of the corresponding specific code element in the second code unit depending on the specific condition of the particular code element in the first code unit. FIG. 37 shows an example of a circuit diagram for such a device. The circuit of FIG. 37 is for use with the code table in FIG. 21 and the key arrangement in FIG. 22. In FIG. 37, contacts # 's 1-6 are code element contacts electrically cooperating with the code bar for the particular machine (the remaining parts are not illustrated, however, since various well known code bar mechanisms for use with keyboards of conventional teleprinters, which produce code units by the displacement of mechanical parts or by actuating related contacts, can be used) every time keys 1 to 48 and space keys SP2 and SP1 on the keyboard in FIG. 22 are actuated, and contacts # 's 1-6 correspond to code elements *b1*–*b6*, respectively. The contacts are illustrated in positions in which every code element is a space, and the mark condition is produced by moving each contact to the position in which each output line # 's 1-6 is grounded. The contact SHc functions to energize the relay SH when contact arm SH key in FIG. 22 is actuated, moving the contacarm of switch sh in the output line # 2 for the code element *b2* to the opposite position from that shown, to connect the contact # 2 to the output line # 2, which results in the conversion of code element *b2* to a mark if it is a space, and vice versa. The contact CTRLc closes when the CTRL key in FIG. 22 is actuated, energizing the relay CTRL and actuating switch ctrl for converting the condition of the code element b4 in the same manner. Contacts UN1 and UN2 are closed every time any key 1 to 48, SP1 or SP2 in FIG. 22 is actuated, the contact UN1 grounding the output line OUT through the contact. When the contact UN2 is closed, the contact *a* is closed by the relay coil A as long as the contact CTRLc is not closed to energize relay CTRL (i.e. the CTRL key in FIG. 22 is not actuated and therefore a character code unit or a space code unit is generated), which in turn energizes the relay coil B when the contact UN2 is restored to the normal condition. When the relay coil B is energized upon closure of contact UN1, it closes the contact $b_4$ and the lamp L is lighted which indicates that the first code unit (X code unit) has been produced and the second code unit (Y code unit) must be produced. The contact $a_2$ is also closed by the relay coil A, and if the code element b1 in the first code unit is a space and the contact # 1 is in the condition illustrated, the relay coil E is energized, and an indication of the necessity to convert the condition of the code element *b1* of the second code unit to a mark or a space is memorized by actuation of the holding contact $e_1$. If the relay coil E is energized when the relay coil B is energized, the relay coil F is also energized by the closing of contacts $e_2$ and $b_2$, and contact *f* in the circuit for the code element b1 is reversed for the second code unit. If the contact UN2 is moved again by operation of the keyboard to produce a second code unit, the relay coil C is energized because the contact $b_1$ has been shifted by the previous operation of the relay coil B, and the contact *c* closes, which energizes the relay coil D if the contact UN2 has been restored to the normal condition. Relay coil D opens the contact *d* which results in the deenergization of relay coils A and B, the contacts $b_2$ and $e_2$ are opened, which results in the deenergization of relay coils C, D and F. That is, the circuit is restored to the condition for producing a first code unit. If the contact CTRLc is moved by actuation of the CTRL key in FIG. 22, relay coils A and B are deenergized, which returns the circuit to the condition to produce a first code unit.

An example of the device comprising a relay circuit has been described above. However, an electronic circuit can be used for the said device, and the same control is possible by controlling the even and the odd with a device to indicate the character number in a line calculating the number of character code units or space code units.

It is thus seen that by this invention, by providing a character board separate from the keyboard, it has been possible to arrange the character board to simplify looking up characters without restriction of the character board arrangement due to the structure of the keyboard. Moreover, the character board may be conveniently located for observation without it being necessary to look at the keyboard. Second, the key arrangement on the keyboard and the key operation is similar to those of the teleprinter and the Roman alphabet typewriter, which facilitates high speed operation for those experienced in operating a Roman alphabet typewriter once they become accustomed to the character board. The operation of the keyboard based on the ISO code described at the beginning of this specification, is just the same as that of the Roman alphabet teleprinter for the ISO code. Third, the separation of the character board and the keyboard makes it possible to look for the next character while carrying out keyboard operation for a prior character. Indications of characters on keys on the keyboard of prior art devices have heretofore made it impossible to look for the next character before the operation for a prior character was finished. This deficiency has been overcome by the present system and this increases the efficiency of operators. Fourth, lower manufacturing cost is possible due to the simple mechanical construction.

What is claimed is:

1. An apparatus for producing a pair of multi-element code units each representative of characters and symbols such as Chinese characters, comprising a keyboard device having a keyboard with a plurality of keys each corresponding to an individual key character and code unit producing means connected to said keys for producing a different multi-element code unit each time a key is actuated and a character board having two sets of blocks thereon each set having the same number of blocks as the number of said keys and each block in each set corresponding to an individual key character and said blocks being arranged in the same arrangement as the arrangement of the keys of said keyboard with blocks for the respective key characters in the same positions relative to the other blocks as the keys for the corresponding key characters are positioned relative to the other keys, and each of said blocks in one set having therein a plurality of characters of symbols or a mixture of the two for which code units are to be produced, arranged in the same pattern as the pattern in which the keys are arranged on one half of the keyboard, and each of the blocks in the other set of blocks having therein a plurality of characters or symbols or a mixture of the two for which code units are to be produced, arranged in the same pattern as the pattern in which the keys are arranged on the other half of the keyboard, all of the characters and symbols in the blocks being different from each other, whereby when a pair of code units representative of a charcter are to be produced, the character or symbol is located in one of the blocks on the character board, the key corresponding to the one block is actuated to produce the first code unit of the pair, and then the key corresponding to the position of the character in the block is actuated to produce the second code unit of the pair.

2. An apparatus as claimed in claim 1 in which the keyboard has four rows of keys each having 12 keys as in the keyboard of a Roman letter typewriter, and further has a plurality of function keys for producing a code unit, whereby a pair of multi-element code units representative of a function can be produced by actuating a character key and a function key.

3. An apparatus as claimed in claim 1 in which the keyboard has five rows of keys each having 12 keys in the manner of a Roman letter typewriter, and furthur has a plurality of function keys for producing a code unit, whereby a pair of multi-element code units representative of a function can be produced by actuating a character key and a function key.

4. An apparatus as claimed in claim 1 in which the most frequently used characters are in blocks on the character board in which the characters are arranged in the pattern of the half of the keyboard other than the half in which the keys having the same key characters as the said lastmentioned blocks are located.

5. An apparatus as claimed in claim 1 in which said keyboard further has at least one shift function key and a conversion function key, and a device coupled to said keys and to said code unit producing means for distinguishing the first code unit of a pair of code units from the second code unit, for determining whether one of the elements of the code unit is in one or the other of two conditions, and for converting the condition of said element to the condition other than that which it is in upon actuating of the shift key, and not converting said condition when both the shift key and the conversion keys are actuated.

* * * * *